(12) United States Patent
Partridge et al.

(10) Patent No.: US 12,308,627 B2
(45) Date of Patent: May 20, 2025

(54) SELF-REGISTERING, -SQUARING, AND -SUPPORTING MOUNT APPARATUS AND METHOD

(71) Applicant: Lightning Protection Systems, LLC, North Salt Lake, UT (US)

(72) Inventors: Kirk Partridge, North Salt Lake, UT (US); Todd Vought, North Salt Lake, UT (US); Travis Vought, North Salt Lake, UT (US)

( * ) Notice: Subject to any disclaimer, the term of this patent is extended or adjusted under 35 U.S.C. 154(b) by 271 days.

(21) Appl. No.: 17/681,402

(22) Filed: Feb. 25, 2022

(65) Prior Publication Data

US 2022/0181862 A1 Jun. 9, 2022

Related U.S. Application Data

(60) Continuation-in-part of application No. 17/061,162, filed on Oct. 1, 2020, now Pat. No. 11,637,418, which
(Continued)

(51) Int. Cl.
*H02G 3/32* (2006.01)
*F16B 2/24* (2006.01)
(Continued)

(52) U.S. Cl.
CPC .............. *H02G 13/40* (2013.01); *F16B 2/245* (2013.01); *F16B 11/006* (2013.01);
(Continued)

(58) Field of Classification Search
CPC .......... H02G 13/00; H02G 1/14; H02G 13/40; H02G 3/32; F16B 2/245; F16B 11/006; F16B 37/047; F16B 47/003; F16B 5/0685; Y10T 29/49117; Y10T 29/49869; Y10T 29/49947; Y10T 29/49966
(Continued)

(56) References Cited

U.S. PATENT DOCUMENTS 1,381,236 A  6/1921 Pleister
1,876,514 A  9/1932 Brach
(Continued)

OTHER PUBLICATIONS http://www.uline.com/Grp_240/3M-VHB-Tapes?pricode=WI849 &AdKeyword=3m%20vhb%20tape&AdMatchtype=e&gclid= COvctNuh58QCFViUfgodHY8APA&gclsrc=aw.ds, Apr. 7, 2015.
(Continued)

*Primary Examiner* — Angel R Estrada

(57) ABSTRACT

An anchor for components of a lightning protection system may rely on a bonding agent, such as an adhesive, needing time for curing, drying, or otherwise setting (increasing in adhesion, strength, mechanical stability, or any combination thereof) by remaining in place while setting. The anchor may be suspended by a lip extending horizontally past an edge (plane of intersection of two planar surfaces) where a base plate is adhered to a vertical surface and the lip rests, registers in translation, and squares in rotation against a horizontal surface sharing an edge or fold (corner, bend) with the vertical surface. Once set sufficiently, the adhesive supports loads in shear (along plane of adhesion) and tension (perpendicular to plane of adhesion) imposed by brackets holding a cable, point, or both at each base plate.

15 Claims, 13 Drawing Sheets

Related U.S. Application Data is a division of application No. 16/162,826, filed on Oct. 17, 2018, now Pat. No. 10,797,478, and a division of application No. 15/008,152, filed on Jan. 27, 2016, now Pat. No. 10,135,233, and a continuation-in-part of application No. 14/448,684, filed on Jul. 31, 2014, now Pat. No. 9,263,864, and a continuation-in-part of application No. 13/676,292, filed on Nov. 14, 2012, now Pat. No. 8,950,055.

(60) Provisional application No. 63/153,769, filed on Feb. 25, 2021.

(51) Int. Cl.
| | |
|---|---|
| *F16B 11/00* | (2006.01) |
| *F16B 37/04* | (2006.01) |
| *F16B 47/00* | (2006.01) |
| *H02G 13/00* | (2006.01) |
| *F16B 5/06* | (2006.01) |

(52) U.S. Cl.
CPC .......... *F16B 37/047* (2013.01); *F16B 47/003* (2013.01); *H02G 3/32* (2013.01); *H02G 13/00* (2013.01); *F16B 5/0685* (2013.01); *Y10T 29/49117* (2015.01); *Y10T 29/49826* (2015.01); *Y10T 29/49869* (2015.01); *Y10T 29/49947* (2015.01); *Y10T 29/49966* (2015.01)

(58) Field of Classification Search
USPC ... 174/480, 481, 486, 52, 68.1, 68.3, 135, 2, 174/5 R, 5 SG, 5 SB, 3; 248/74.1, 553, 248/188; 156/71; 29/525.01, 449, 428, 29/525.13
See application file for complete search history.

(56) References Cited

U.S. PATENT DOCUMENTS

| | | | | |
|---|---|---|---|---|
| 1,963,951 A | * | 6/1934 | Bowers | H02G 3/125 174/58 |
| 2,166,916 A | | 7/1939 | Lombard | |
| 2,783,447 A | | 2/1957 | Watts | |
| 3,230,817 A | | 1/1966 | Thomas | |
| D244,197 S | | 5/1977 | Ostroll | |
| 4,140,293 A | * | 2/1979 | Hansen | H02G 3/125 220/3.9 |
| D251,779 S | | 5/1979 | Wolff et al. | |
| D262,617 S | | 1/1982 | Shumate | |
| D268,316 S | | 3/1983 | Shamoon | |
| D285,192 S | | 8/1986 | Hubbard et al. | |
| D285,246 S | | 8/1986 | Fetty | |
| D294,676 S | | 3/1988 | Egner et al. | |
| D295,258 S | | 4/1988 | Niwa | |
| D295,368 S | | 4/1988 | Niwa | |
| D302,655 S | | 8/1989 | Sachs | |
| 4,978,092 A | * | 12/1990 | Nattel | H02G 3/123 248/300 |
| D315,668 S | | 3/1991 | Murphy | |
| 5,050,836 A | | 9/1991 | Makous | |
| 5,070,805 A | | 12/1991 | Plante | |
| 5,094,622 A | * | 3/1992 | Auclair | H01R 4/64 439/94 |
| D331,358 S | | 12/1992 | Sachs | |
| D334,332 S | | 3/1993 | Massey | |
| D342,013 S | | 12/1993 | Sachs | |
| D349,038 S | | 7/1994 | Sachs | |
| D356,729 S | | 3/1995 | Kassouni | |
| 5,407,310 A | | 4/1995 | Kassouni | |
| 5,518,440 A | | 5/1996 | Bone | |
| D371,293 S | | 7/1996 | Schoenmeyr | |
| D376,713 S | | 12/1996 | Kelso | |
| D376,972 S | | 12/1996 | Zissu | |
| 5,581,900 A | | 12/1996 | Payne | |
| D382,920 S | | 8/1997 | Munir | |
| D390,099 S | | 2/1998 | Bailey | |
| 5,796,032 A | | 8/1998 | Hadley | |
| 5,799,404 A | | 9/1998 | Payne | |
| 5,819,425 A | | 10/1998 | Payne | |
| 5,839,303 A | * | 11/1998 | Umberg | E05B 73/0082 248/553 |
| D407,012 S | | 3/1999 | Williams | |
| D426,146 S | | 6/2000 | Bruns et al. | |
| D431,176 S | | 9/2000 | Zarnoti | |
| 6,369,317 B1 | | 4/2002 | Rapp | |
| 6,495,754 B2 | * | 12/2002 | Ichikawa | H05K 5/0013 174/54 |
| D470,039 S | | 2/2003 | Pelc | |
| D471,400 S | | 3/2003 | Jeter et al. | |
| 6,734,356 B1 | * | 5/2004 | Gretz | F04D 25/088 174/53 |
| 7,117,972 B2 | * | 10/2006 | Mattson | E05F 15/668 181/207 |
| 7,154,040 B1 | * | 12/2006 | Tompkins | H02G 3/126 174/53 |
| 7,208,679 B2 | * | 4/2007 | Phillips | H02G 3/126 174/64 |
| 7,285,722 B2 | * | 10/2007 | Shyr | F16B 5/0291 174/53 |
| D604,534 S | | 11/2009 | Guggenbiller, Jr. | |
| D618,992 S | | 7/2010 | Rix | |
| D623,868 S | | 9/2010 | Schiestl | |
| D636,656 S | | 4/2011 | Schaefer et al. | |
| 8,050,007 B1 | | 11/2011 | DeGurski et al. | |
| D662,805 S | | 7/2012 | Macdonald et al. | |
| D663,612 S | | 7/2012 | Pelc | |
| D678,039 S | | 3/2013 | Psaila | |
| D679,172 S | | 4/2013 | Dixon | |
| D716,636 S | | 11/2014 | McDonald | |
| 8,950,055 B2 | | 2/2015 | Partridge et al. | |
| D726,365 S | | 4/2015 | Weigensberg | |
| D729,572 S | | 5/2015 | Moran | |
| D734,133 S | | 7/2015 | Spindler | |
| D737,120 S | | 8/2015 | Recker et al. | |
| 9,096,284 B2 | | 8/2015 | Meulemans | |
| D745,369 S | | 12/2015 | Tungesvick | |
| 9,263,864 B2 | | 2/2016 | Partridge et al. | |
| D758,830 S | | 6/2016 | Partridge et al. | |
| D762,455 S | | 8/2016 | Partridge et al. | |
| D764,896 S | | 8/2016 | Partridge et al. | |
| D764,897 S | | 8/2016 | Partridge et al. | |
| 9,590,398 B2 | | 3/2017 | Partridge et al. | |
| D814,277 S | | 4/2018 | Partridge et al. | |
| 10,135,233 B2 | | 11/2018 | Partridge et al. | |
| 10,250,025 B2 | | 4/2019 | Partridge et al. | |
| 10,797,478 B2 | | 10/2020 | Partridge et al. | |
| 11,637,418 B2 | * | 4/2023 | Partridge | H02G 13/40 174/3 |
| 2005/0183261 A1 | | 8/2005 | Nebesnak et al. | |
| 2011/0253579 A1 | | 10/2011 | Chong | |
| 2011/0286785 A1 | | 11/2011 | Brouwer et al. | |
| 2012/0301300 A1 | | 11/2012 | Muto | |
| 2015/0282612 A1 | | 10/2015 | Rutz | |

OTHER PUBLICATIONS http://www.youtube.com/watch?v=U2vbR34jBzk&feature=related 3M VHB adhesive demonstration holds up man—Another Geek Moment, Screenshot, Apr. 7, 2015.
http://www.youtube.com/watch?v=hNgto13IsQ4 30 Years of 3M™ VHB™ Tape, Screenshot, Apr. 7, 2015.
http://www.lightningrodsupply.com/index_files/page0001.htm Lightning Rod Parts Equipment, pp. 1-5, Apr. 7, 2015.
http://www.erico.com/products/LP302.asp ERICO® Eritech® Universal Air Terminal Base LP302 pp. 1-2, Apr. 7, 2015.
http://www.enrico.com/products/SR000E.asp ERICO® ERITECH® System 2000 Lightning Protection System—America pp. 1-2, Apr. 7, 2015.
http://www.kuefler-lightning.com/series800-fasteners.htm?gclid= CKfk_vSk5cQCFY-Tfgod Lightning Protection Copper, Aluminum

(56) References Cited

OTHER PUBLICATIONS

Cable Straps, Holders for Standing Seam Roofing Series 800—Lightning Protection Conductor Fasteners pp. 1-5, Apr. 7, 2015.

\* cited by examiner

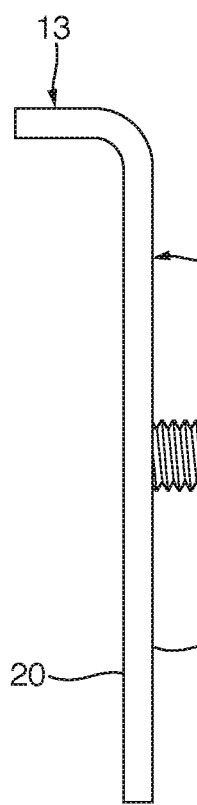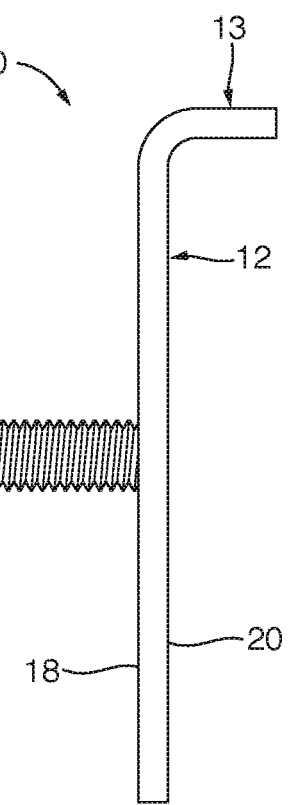
FIG. 5                    FIG. 6

SELF-REGISTERING, -SQUARING, AND -SUPPORTING MOUNT APPARATUS AND METHOD

RELATED APPLICATIONS

This application claims the benefit of U.S. Provisional Patent Application Ser. No. 63/153,769, filed on Feb. 25, 2021 and entitled SELF-REGISTERING, -SQUARING, AND-SUPPORTING MOUNT APPARATUS AND METHOD, which is also hereby incorporated herein by reference in its entirety. This application is a continuation in part of U.S. patent application Ser. No. 17/061,162 filed Oct. 1, 2020, which is a divisional application of U.S. Pat. No. 10,797,478 issued Oct. 6, 2020, which is a divisional of U.S. Pat. No. 10,135,233 issued Nov. 20, 2018; which is a continuation in part of U.S. Pat. No. 9,263,864 issued Feb. 16, 2016; which is a continuation in part of U.S. Pat. No. 8,950,055 issued Feb. 10, 2015; all of which are hereby incorporated herein by reference in their entirety.

FIELD OF THE INVENTION

This invention relates to lightning protection systems and, more particularly, to novel systems and methods for mounting and anchoring cables and points (air terminals) thereof.

BACKGROUND ART

Lightning arresters are central to power systems. Typical power delivery and transmission systems involve towers or power poles holding long expanses of power-carrying cables high above the surface of the earth and across large tracts of land. The power delivery systems of the public utilities create a grid across the country connecting cities, power plants, substations, generators, dams, and so forth.

Surge arresters or lightning arresters are responsible for drawing the current from lightning into conductors that will conduct the energy to ground. Accordingly, they may involve wires and air terminals above the level of the power carrier cables. Meanwhile, addition surge protection may be provided to assure that no breakdown occurs in the insulators that insulate the main power carrier lines from their towers or poles that suspend them above the earth.

Buildings have a similar problem. They stand above the earth and tend to draw lightning. Thus, lightning rods date from very early days in America. Basic lightning rod systems of yesteryear involved an air terminal or "point" that was typically fastened to extend above the highest point of a building. This air terminal or point was connected to a cable that conducted electricity from the point down to ground, literally the surface of the earth.

With modern architecture and modern buildings, the problem has become more complex in that multiple air terminals or points may be attached to a building, and a building may not have a single point as its highest location. Often, with false fronts, parapets, and other architectural features, a rather large expanse of a building's architecture may be located at the "highest" location. Large expanses of polymeric or metallic material in sheets may be formed and placed over structural features to protect the structure against weather. Owners and buildings are loathe to penetrate such protective outer layers, even for lightning protection systems. Seals do not always seal, nor do they seal forever.

Lightning protection systems require time, cost, labor, appearance, durability, and so forth associated with installation. For example, conventional adhesives or glues require time to "set" or "cure" sufficiently to carry the mechanical load (weight, tension forces, etc.) imposed on mounting hardware or other components securing cables (conductors) and points (strike-drawing rods) to a protected structure. Curing or setting (firming to an increased strength) may take excessive time, especially if mounting hardware is adhered by an adhesive or glue to a vertical surface.

Better, faster, labor-saving methods and components are needed in lightning protection. Installation still needs improvement in outcomes, such as precision placement and orientation of points (lightning air terminals). Meanwhile, simpler and more reliable mechanisms are needed for registering, squaring, holding, supporting, and permanently fixing mounting hardware, brackets, cables, and points. All of these improvements would benefit from simpler processes requiring less time and less skill from installation technicians.

BRIEF SUMMARY OF THE INVENTION

Lightning protection for buildings and other structures has been improved by reducing labor time, reducing tools required, avoiding misalignment, reducing the number of component parts, and other benefits in an invention fully compliant with applicable industrial standards, for both construction and lightning protection. An anchor for components of a lightning protection system may rely on a bonding agent, such as an adhesive, needing time for curing, drying, or otherwise setting (increasing in adhesion, strength, mechanical stability, or any combination thereof) by remaining in place while setting.

Of course aesthetics matter to architects and owners of buildings and other structures. Neatly aligned cables secured to a surface (vertical or horizontal) should not sag or take on irregular shapes. The connected rows of points distributed along the cables need to contain points of uniform height, uniformly spaced, and precisely oriented in the same direction. Failure to register (position at a pre-determined location, typically translation, linear in any or all dimensions) any mounting system, secure it in place, and install a point meeting those criteria may require rework or look imprecise, sloppy, or otherwise detract from the silhouette or other appearance of a building or other protected structure. "Squaring" typically refers to aligning rotation to a specific orientation defined by a straight line or surface. "Registration" may also be used as a term to express a process of fitting an object into a location constrained or stopped in one or more dimensions.

The anchor formed with a base plane may be suspended by a lip extending horizontally from the vertically oriented base plane. The lip aligns against a horizontal surface along an edge (plane of intersection of two planar surfaces). The base plate is adhered to a vertical surface and the lip rests, registers in translation, and squares in rotation against a horizontal surface sharing an edge or fold (e.g., corner, bend) with the vertical surface.

Even a glass plate oriented vertically must have edges all around, and will typically be oriented to have an upper edge running horizontally from which a lip of a fastener in accordance with the invention may suspend. That edge may be represented mathematically as a line, which is theoretically infinitesimally thin. No physical object is actually infinitesimal nor infinite. The glass is not infinitesimally thin, but presents itself as a horizontal surface, orthogonal to its vertical surface of maximum dimensions, and itself having orders of magnitude smaller, but still finite, dimensions.

Once set sufficiently, the adhesive supports loads in shear (along or parallel to the plane of adhesion) and tension (perpendicular to and away from plane of adhesion) imposed by brackets holding tension and weight from a conductor cable, point, or both secured at each base plate. Until that time, during installation, the fixture is supported against the downward force of gravity by the lip fitted snugly against a top edge (and its finite surface) of the horizontal surface to which the adhesive adheres.

Typically, cables of a suitable size (about half an inch diameter; 1.25 cm) will be connected, anchored at approximately every three feet along their length, and run from point to point, where a "point" indicates an air terminal or a lightning "point" as that term is used in the art. The points on a building may be precisely mounted, held in place, supported during curing or set of a conventional adhesive, or use an adhesive pad. All may be connected to one another and to a grounding cable that carries any electrical power received from the points down to the ground.

Interfacing hardware (mounts and related hardware) securing to a structure can accommodate virtually any structural design. For example, buildings or other protected structures may be constructed of wood, masonry, concrete, steel, glass, combinations and so forth. The range of materials and their material properties vary widely. Similarly, lightning protection is not the only consideration in designing a building. Herein, the words building and structure are used interchangeably to mean any structure to be provided with lightning protection.

Meanwhile, lightning protection may be provided retroactively. Buildings may already exist, and lightning protection may not have been designed into them. By the same token, even when lightning protection is contemplated during the architectural phase of a building, the attachment scheme of a lightning protection system is a consideration that must be dealt with in view of the other architectural features of the building.

Fasteners are connected by any suitable means, which usually involves fastening to a structural portion of the building. Thus, protective covers, plates, caps, sheeting, flashing, or other mechanisms for protecting the upper reaches of a building from weather need not be damaged, penetrated, breached, or otherwise compromised by fasteners of a lightning protection system in accordance with the invention. It is a less invasive lightning protection system, yet simpler, easier, and more reliably installed, requiring less time and skill to obtain a satisfactory technical result and aesthetic result.

Specific improvements include a universal mounting system for lightning arrester points, the point or rod that literally draws a lightning strike to a the ground wire or cable of a protection system, rather than to the protected structure. Points may be oriented on a horizontal surface, a vertical surface, such as a parapet, wall, or some other location. The universal mounting system has a base that will mount a suitable holder or bracket for securing a cable or point to the protected building, regardless of materials in the building.

The mounting system renders points capable of being oriented. The base plate may hold a base acting as a mounting interface to receive a lightning arrester point in a vertical orientation. Meanwhile, receiving a cable for carrying current from the point and its corresponding mounting hardware is accommodated such that orienting the mount to receive the point provides a suitable securement mechanism and location for receiving and securing the conducting cable.

It has been Applicants' experience that conventional mounting hardware is sometimes destroyed by a lightning strike because the connections are insufficiently robust, the contact area is insufficiently extensive, and the cross sectional area of mounting hardware is too small for proper current conduction of the current from a lightning strike.

The invention provides rapid placement, precise registration, heavy holding capacity, and securement during and after cure of adhesives. The system provides more electrical current cross sectional area, greater contact area, and greater mass, all beneficial in the entire contact path from a point to the conducting cable of a lightning protection system.

In view of the foregoing, in accordance with the invention as embodied and broadly described herein, a method and apparatus are disclosed in one embodiment of the present invention as including an anchor suitable for supporting the weight of a cable, a point, or other accessories associated with a lightning arrester system. In certain embodiments, an anchor in accordance with the invention may include a base or plate from which a stud extends. In this embodiment, the base or plate and the stud together form a mounting system to which to secure a bracket or other device designed to secure a cable, point, or the like.

For example, an adhesive pad or interface pad may be secured to the flat, back side of the plate, opposite the stud on the other side. The pad may provide differential strain and stress between a portion of the building or a location of the building where the anchor is mounted, and the material of the base.

Likewise, the material of the pad may be selected to provide shock resistance, sealing, flexibility, impact resistance, adhesion, and a reconciliation of differing coefficients of thermal expansion between the material of the building and the base of the anchor secured thereto.

In some embodiments, the stud may be threaded to receive a nut or other keeper. Similarly, ratchets, binding slides, keys, pins, and other types of fasteners may be used to secure brackets to the stud in order to anchor points, cables, or both to the anchor, which in turn secures them to the building.

In certain embodiments, a building may include a parapet, wall, or other architectural feature that acts as the extremum the maximum distance away from the ground. Accordingly, this parapet or wall may have a flashing, cap, protection, seal, coating, or the like protecting it from the elements. Accordingly, either a conventional adhesive material or an elastomeric, adhesive-treated pad may be provided. Such a structural adhesive may requiring time to "set" or "cure" in the former case. In the latter case, the pad secures to the outermost surface, whether vertical or horizontal, whether it is functionally a flashing, seal, cover, cap, decorative treatment, or the like of the building.

The base plate may be basically flat on a "back" side adhered to the structure. Alternative, the base plate may have a lip proceeding at a right angle, backward from the back side as a registration stop, also acting as a square to orient the base plate in alignment with an edge of the surface against which it is registered and to which it is attached. Thus, conventional adhesives can be used, as the weight of the base plate is supported by the lip extending horizontally above its main vertical surface.

Horizontal mounting places the registration lip extending down along a vertical surface, while the main back surface of the base plate rests on the horizontal surface of the protected structure. Elastomeric, double-sided-adhesive-treated, securement pads may be used between the base plate and the mounting surface of the protected structure, but need not be. Such an instantly secured, attachment mechanism is not needed in a system in accordance with the invention.

Thus, the anchor need not penetrate the protection provided against weather on the building. In certain embodiments, a stud fixed to and extending through the base plate and away from the structure may hold a bracket of any suitable type. That bracket may secure a point, a standoff, a bracket, a clip, or other holder suitable for holding in place a cable, a point, or some other component of the lightning protection system.

Anchor systems must support any leverage, moment, or couple (engineering terms, used here as known in the engineering art) to support the weight of cables and points. The cables need to be supported not only against their own dead weight, but also against the weight of pulling or tensioning to which installers will subject the cables in order to minimize the sag in the cables.

A cure condition may be required for any of several reasons. For example, polymers may need time, heat, cooling, ultraviolet light, reaction, setting, drying, or other chemical or thermal effects in order to achieve a designed holding capacity. In certain embodiments, where materials are adhesives that do not rely on the chemistry of their base material or of the location to which attached, materials may simply need time in order to fully flow, creep, react, set up, dry, or otherwise stabilized and secure with their intended and designed force to an anchoring location. By whatever means required, establishing a cure condition may be followed by positioning cables, including tensioning them in order to reduce sag. Ultimately, the cables may be bound to the anchors by brackets, whether integrated, bolted on, or the like.

Meanwhile point mounts may be effected by selecting locations for placing base plates along an edge of a surface of a structure to be protected. Then, after applying a glue, adhesive, resin, or the like to the "back" side of the base plate opposite the extending stud, registering it by urging the adhesive and base plate against the surface to adhered to while pushing the lip to slide toward and into contact with the edge of that adhesion surface, actually the continuing surface extending perpendicularly to the adhesion surface.

Such a system provides many benefits. Installation is rapid, the lip and base plate together maintain vertical (or horizontal) registration and square up pivoting orientation on the adhesive surface, supporting the base plate, thus supporting the base plate vertically until the adhesive is set or cured. The lip will also support the weight of the base plate against vertical movement without requiring clamps or hand-held forces while waiting for curing.

The vertical load on a base plate is always supported by either the base plate or the lip during installation, and everything remains in place by continued support. The lip acts as a registration surface. It positions the base plate at an edge (e.g., fold line) on the mounting surface, establishing its extent of coverage along the mounting surface. The lip also squares up the base plate (pivotably; in rotation about an axis perpendicular to the plane of the plate) against that edge of the mounting surface, the corner line formed by an edge or bend in the protective layer of the building. That line parallel is a similar fold line between the base plate and lip snugly along that edge.

Of course, forces are distributed over suitably large area by anchors in accordance with the invention. The actual cross sectional area of base plate material from the protective cover material or wall protection to which an anchor may be secured is substantially larger than that of a conventional threaded-in fastener. Those merely each penetrate and engage a tiny fraction of a square inch of area of building material. Moreover, with Applicant's invention, there need not be any penetration of any seal, cap, flashing, or other weather protection materials and structures of the building. Thus, capillary action is virtually absent against conformal adhesives, limiting damage the building covered by the protection of the cap, seal, flashing, or the like.

Moreover, no caulking step is required, no washer, caulk, putty, or the like around the area where a penetration would have passed through a protective layer to anchor into structural support. In accordance with the invention, non-penetrating, comparatively rapidly mounted, base plates may be smeared with glue or other adhesive, or provided with an adhesive pad, installed, aligned, squared up, and supported on vertical surfaces or horizontal, then left to cure as long as needed, if needed.

In one specific embodiment of an apparatus and method in accordance with the invention, a head securable to a mounting plate is configured to receive a point extending vertically thereabove. The head may be mounted on a vertical or horizontal surface and still support a point in a vertical orientation.

The head is comparatively thick, thus having substantial electrical current carrying capacity between the point and the cable. The head may be engineered to always present a greater cross sectional area for current flow than does the point, the cable, or any contact surfaces therebetween. Other attachment hardware is not in the direct path of conducting a strike. The head is also sufficiently massive to limit temperature rise, dissipate resistive heating, and maintain structural integrity without melting.

In certain embodiments of apparatus and methods in accordance with the invention, a lip may be optional. An apparatus adapted to mount lightning protection equipment to a structure to be protected may include a base plate, having a first edge, extending longitudinally in a straight line, and a contact surface extending away from the first edge in a direction corresponding to at least a first right angle orthogonal to the longitudinal direction of the edge.

A lip, extending rigidly from the base plate at a second right angle, is orthogonal to the first right angle and to the longitudinal direction of the first edge. A fastener is secured to extend from an outer surface opposite the contact surface, capable of securing a component of a lightning protection system to the base plate. An adhesive is capable of application to the contact surface and securing the contact surface to the structure.

The structure may form a second edge as a junction between a horizontal surface and a vertical surface of the structure, and may include a protective layer continuous through and perpendicular to the second edge, thereby presenting the horizontal and vertical surfaces and the second edge where they join or fold. A "terminal point" head or base may be selectively securable to the base plate by the fastener, or a simpler cable securement bracket as needed.

In certain embodiments, the adhesive has mechanical properties insufficient to support the weight of the apparatus at a time of installation of the base plate and adhesive on the structure. Typically, the base plate is fitted against the adhesive on the exterior (often vertical) surface. Preferably the lip registers the base plate vertically and orients the base plate in rotation about a horizontal axis thereof by squaring the base plate with respect to the second edge, and also supporting the base plate until the adhesive "sets" (obtains sufficient strength for service).

In certain embodiments, the base plate has mass and weight supported by the lip resting on the horizontal surface upon installation, and the adhesive has mechanical properties that increase, with time after installation, a strength thereof in holding the base plate against the vertical surface. The component may be selected from a bracket capable of securing a cable acting as a lightning conductor, and a head capable of securing and vertically orienting a terminal "point." An array of base plates is typically installed around a highest perimeter on the structure, all interconnected by the cable or cables.

A method may include providing an apparatus adapted to mount components of a lightning protection system to a structure to be protected, the apparatus comprising a base plate having a first edge extending longitudinally in a straight line and a contact surface extending away therefrom at a first right angle, a lip extending rigidly from the base plate at a second right angle, orthogonal to the first right angle, and a fastener, secured to an outer surface opposite the contact surface.

After selecting a second edge on a structure to be protected, the second edge constituting a junction of a horizontal surface and a vertical surface of the structure, one may apply an adhesive between the contact surface and the exterior surface of the structure (often a vertical surface). Registering the base plate occurs by urging the lip (or a lipless edge) toward the right angled surface (horizontal surface if adhering to a vertical one) and the contact surface toward the adhering (vertical in the example) surface. Squaring the base plate occurs by urging the entire lip and the entire first edge toward the non-adhering (e.g., horizontal example) surface and second edge, respectively. Typically, the adhesive has mechanical properties incapable of being a sole securement supporting the base plate on the structure immediately upon installation in a vertical orientation. Mechanical properties of the adhesive improve securement to the structure over time, after installation.

The structure often comprises a protective layer forming the second edge, horizontal surface, and vertical surface (all exterior). A fastener secures permanently to the base plate, capable of securing the component to the base plate, while the method includes installing additional base plates while waiting for the adhesive to increase in mechanical strength. Thus, fitting the base plate against the adhesive on the vertical surface may include registering and orienting the baseplate in translation and rotation, respectively, by urging the lip downward against the horizontal surface (in the example), or vice versa for a horizontal adhesion.

The method may be characterized to include securing at least one of a cable, acting as a lightning conductor, and a head, capable of securing the cable and of vertically orienting a terminal "point" as the component, by the fastener.

In one method of installing lightning protection, one will typically provide a plurality of instances (copies) of the apparatus, each adapted to mount a component of a lightning protection system to a structure to be protected and comprising a base plate extending as a planar structure. Racks of teeth are cut thereinto and bent out-of-plane to firmly, usually elastically (although possibly yielding to some necessary degree), support a conductor cable (resiliently) away from the planar structure.

A structure to be protected from lightning, has an exterior surface, oriented in at least one of a vertical plane and a horizontal plane proceeding from an edge. To an instance of the apparatus, one may apply an adhesive between the exterior surface and the base plate. Registering and squaring the base plate in translation and rotation with respect to the edge, one urges the base plate against the adhesive and toward the exterior surface. One may install additional base plates of the plurality of instances while waiting for mechanical properties of the adhesive to increase in strength over time after installation.

Ultimately, one can secure the desired component to the base plate by the fastener, when the adhesive is sufficiently strong to support the base plate and component. The base plate may have a planar portion, presenting a contact surface to receive the adhesive adhering it to the exterior surface, and a lip extending perpendicularly from the planar portion and capable of registering and squaring the base plate with respect to the edge. If the exterior surface is oriented vertically, the lip supports the base plate while the adhesive sets sufficiently to support forces applied by installation of the component.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 5 is a left side, elevation view thereof;

FIG. 6 is a right side, elevation view thereof;

DETAILED DESCRIPTION OF THE PREFERRED EMBODIMENTS

Figure 1:
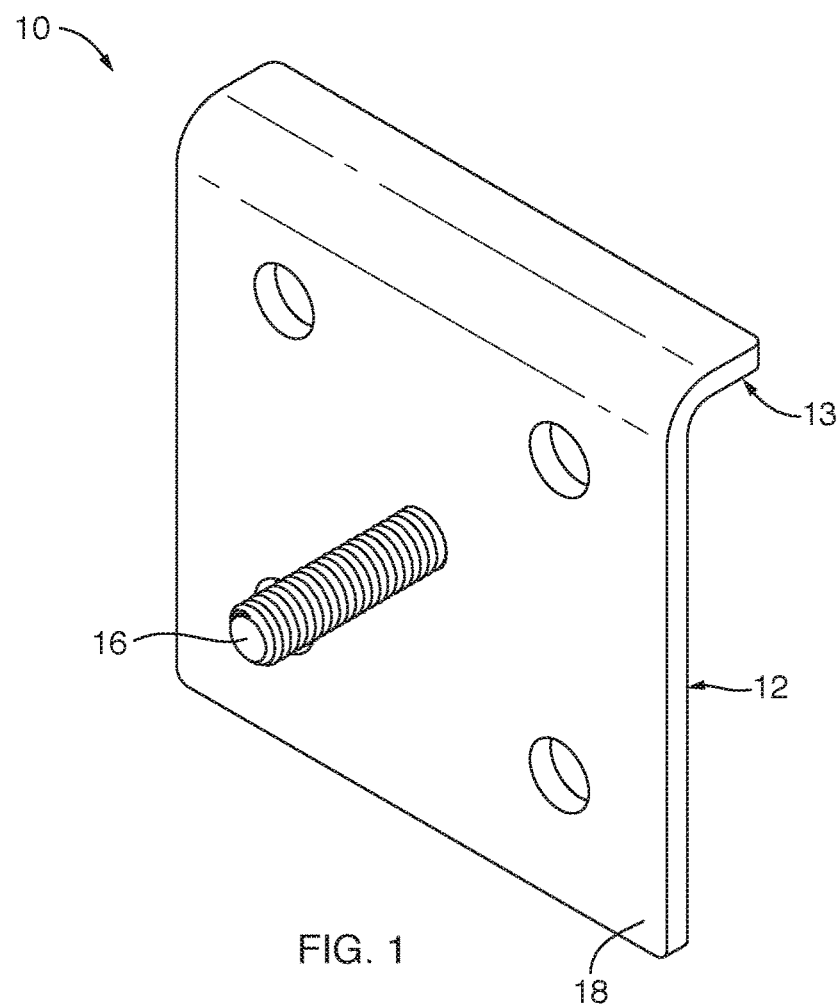
FIG. 1 is a frontal, upper quarter perspective view of a base plate and lip, wherein the lip operates as a registration surface, and as a square to register and orient the base plate at an edge of a surface to which the base plate will mount.
Figure 2:
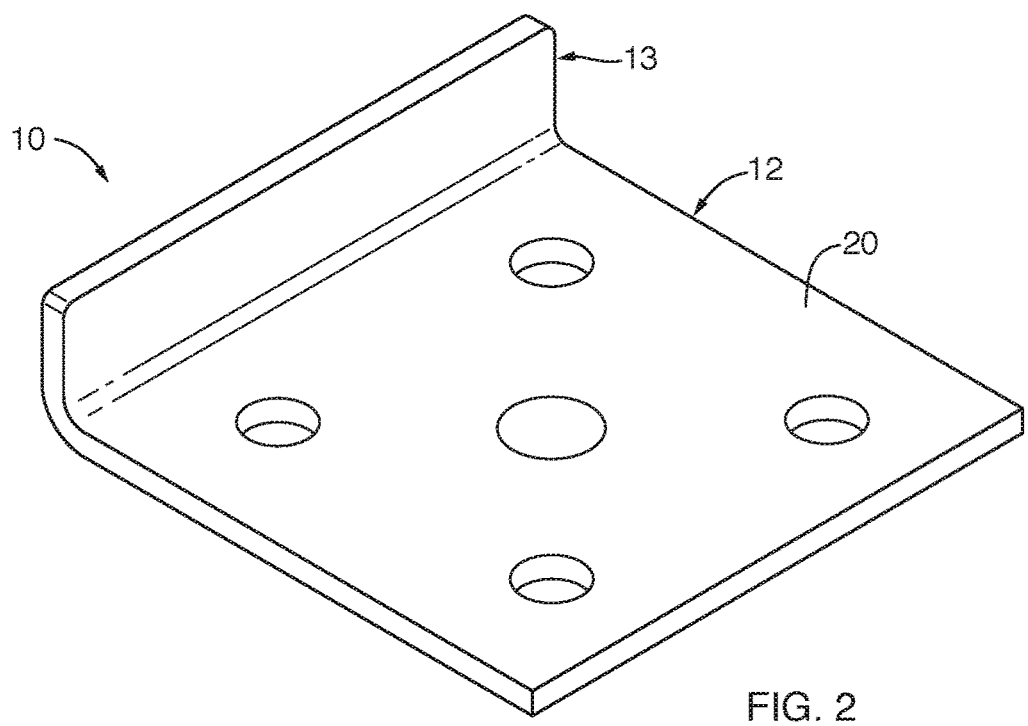
FIG. 2 is a perspective view of a back surface of the base plate and the under surface of the lip, where one may consider the lip as a separate entity from the base plate, or may consider the lip as a particular region of a base plate.
Figure 3:
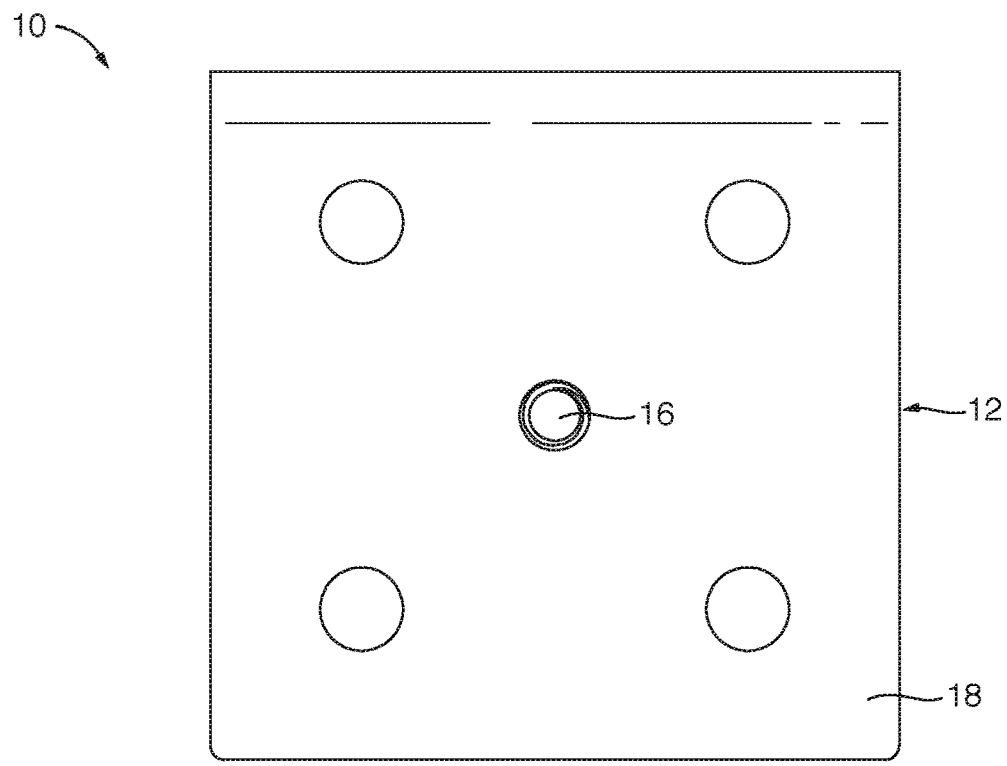
FIG. 3 is a frontal, orthogonal, elevation view thereof.
Figure 4:
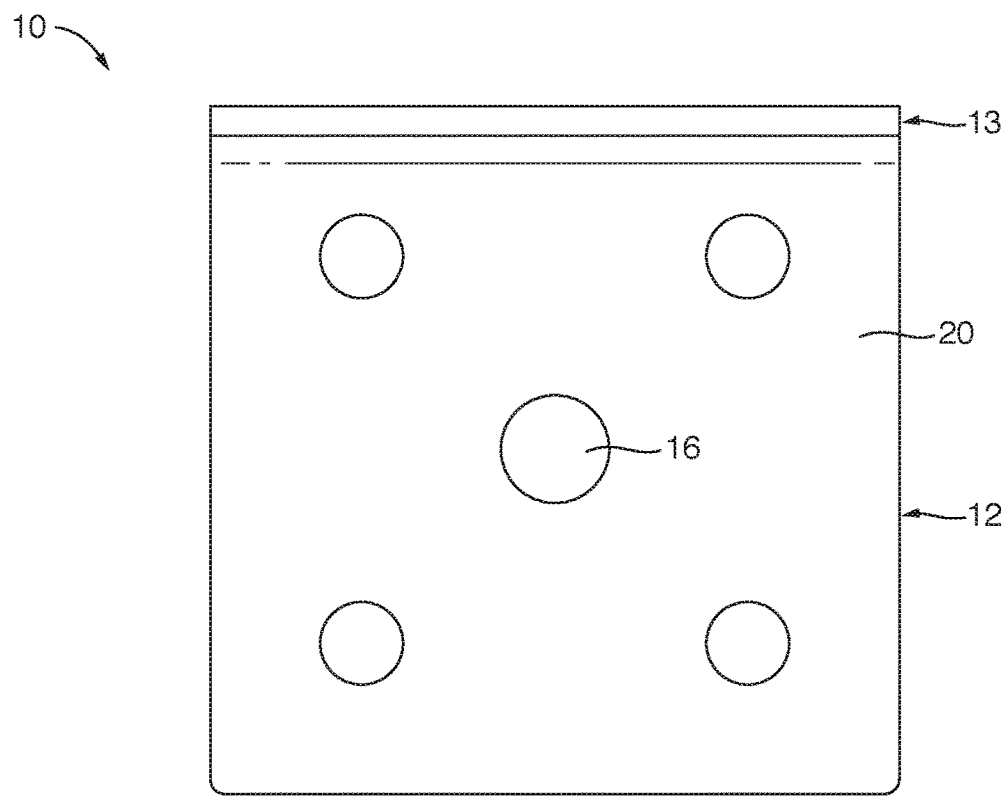
FIG. 4 is a rear elevation view thereof.
Figure 7:
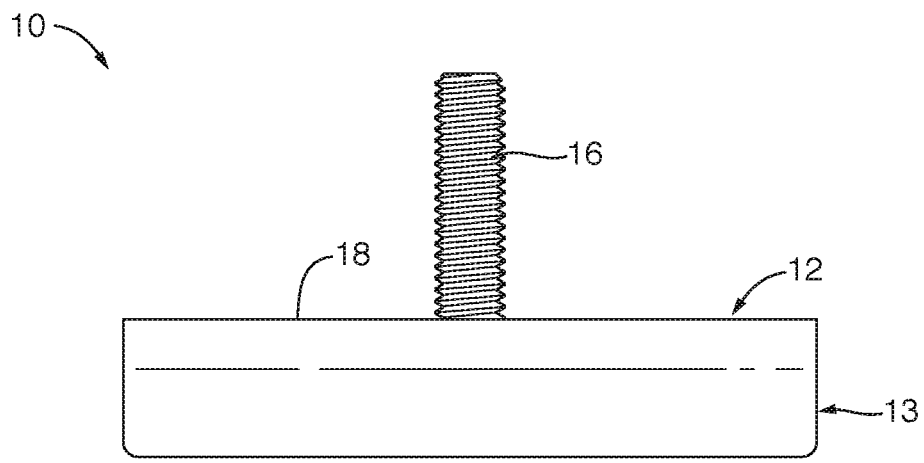
FIG. 7 is a top plan view thereof.
Figure 8:
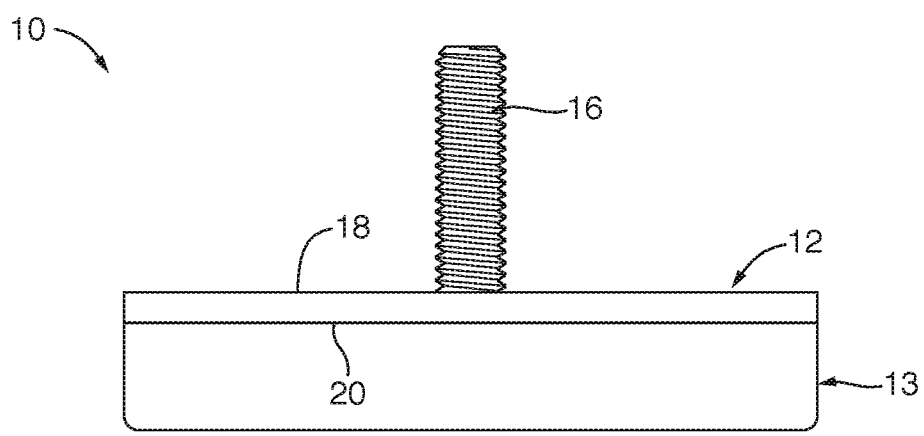
FIG. 8 is a bottom plan view thereof.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout. Appendix A, attached hereto and hereby incorporated herein by reference contains additional views of various embodiments in accordance with the invention, some with more and some with less features.

Referring to FIGS. 1 through 8 illustrating various views of a base plate 12 with a lip 13, and FIGS. 1 through 21 generally, an anchor 10 or anchor system 10 may include a base plate 12 designed to secure to a surface layer 11, an edge thereof, typically a right angle fold line in a protective layer 11 on a building 17. In general, a base plate 12 need not include a lip 13. However, in the instant embodiment, the base plate 12 is secured to or extends as a lip 13 useful for registration (stopping linear translation at a predetermined position) and squaring (pivoting into alignment, such as becoming parallel with an edge of a protected structure). All base plates 12 will eventually secure a conductor cable 57, although that cable is removed in most figures for clarity, thus showing a complete mounting system, not the fully installed system.

One may consider the lip 13 to be a part of the base plate 12 or as its own, individual component 13 or region 13. The lip 13 acts as a registration surface, and as a square to position (register against linear movement and stop; align and fix against rotation, respectively) the base plate 12 on a vertical surface of a protective layer 11 of a building 17. The lip 13 acts as a registration surface in that it stops the base plate 12 from descending below an edge (horizontal-to-vertical "fold line," whether actually "folded" or not) of a vertical protective layer 11 to which it is secured, or is to be secured.

Because the lip 13 extends along the upper edge of the base plate 12, the lip 13 will permit the base plate 12 to descend along a vertical surface 62 of a protective layer 11 until the entire length of the lip 13 is in contact with the adjacent horizontal surface 58, against which the base plate 12 is registered on the protective layer 11.

A stud 16 is secured by any suitable method, of which several are discussed at length in the references incorporated hereinabove by reference. Thus, no need exists to repeat here descriptions all those embodiments and methods. Sufficient is the statement that the stud 16 does not affect the front face 18, which is a flat surface 18, nor the back face 20 which is also smooth and flat.

The stud 16 may be characterized by a tip 26 as the farthest point or extent of the stud 16 away from the base plate 12. Meanwhile, the root 28 of the stud 16 is embedded, welded, swaged, fitted, splined, or otherwise fixed to the base plate 12. Typically, the stud 16 will actually extend through the base plate 12, secured at the back face 20 against release from the front face 18 by a "head" or increased diameter like a nailbed or bolt head.

Referring to FIGS. 1 through 8, while continuing to refer generally to FIGS. 1 through 21, the threads 30 spiraling from the root 28 to the tip 13 of the stud 16 are formed to receive a nut 32 acting as a keeper 32 to keep or secure some type of component between the nut 32 and the front face 18 of the base plate 12.

Figure 9:
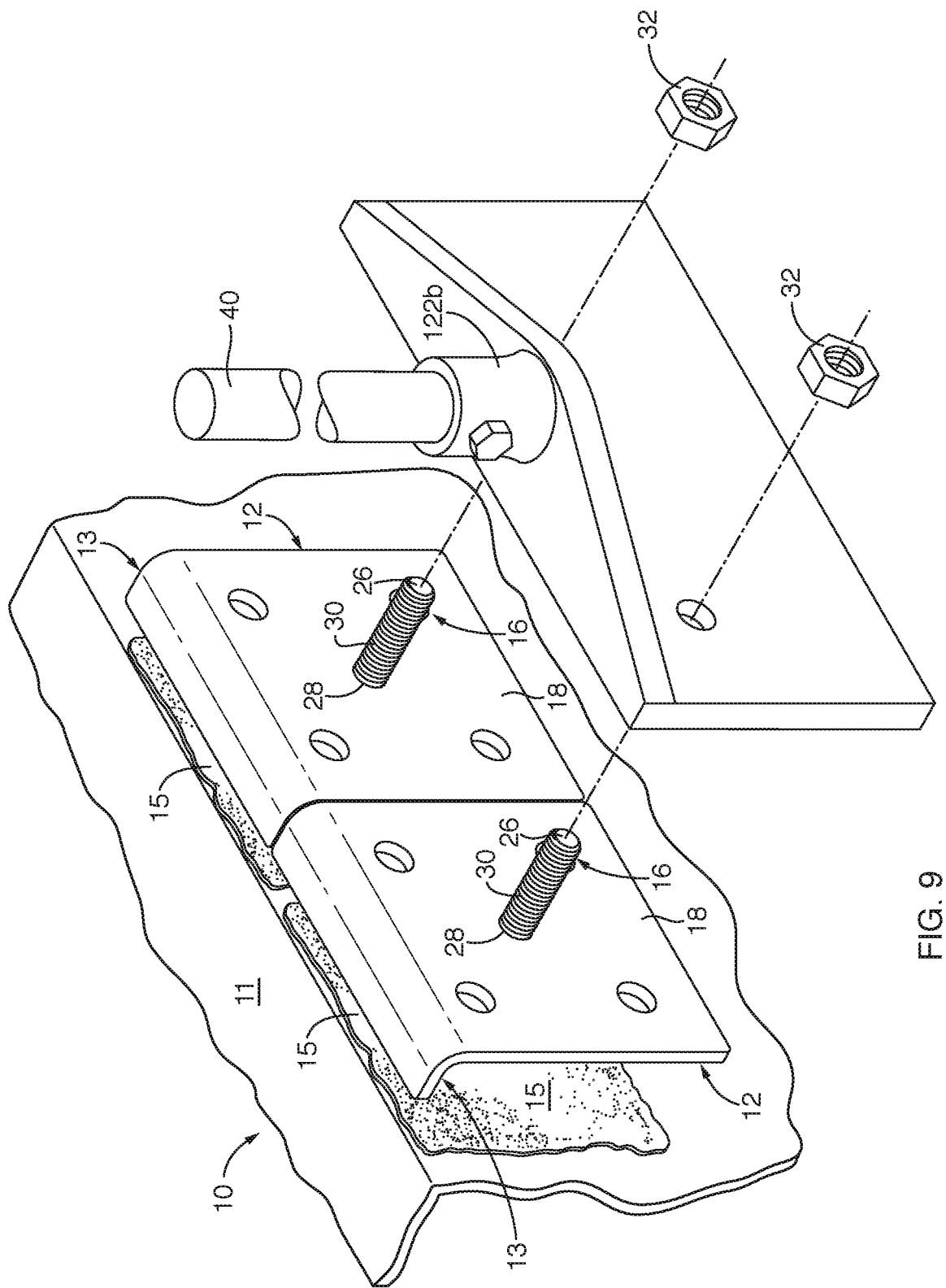
FIG. 9 is an upper, frontal, perspective view of one embodiment of a system in accordance with the invention as installed on a surface.

Referring to FIG. 9, for example, a cable bracket 34 may have an aperture 36. In general, a bracket 34 of any suitable type for a specific purpose may be secured to a stud 16 by a nut 32. The nut 32 draws the aperture 36 along the stud 16 and its threads. In other words, the bracket 34 will be drawn down tightly against the base plate 12 by the nut 32.

In the illustrated embodiment, a point 40 is illustrated in association with one of the brackets 34 to secure to the base plates 12. The point 40 is secured to a point support 42 extending from or as an extension of a bracket 34. In the illustrated embodiment, a receiver 122b may receive the point 40 and secure the point 40 therein for operation.

Figure 10:
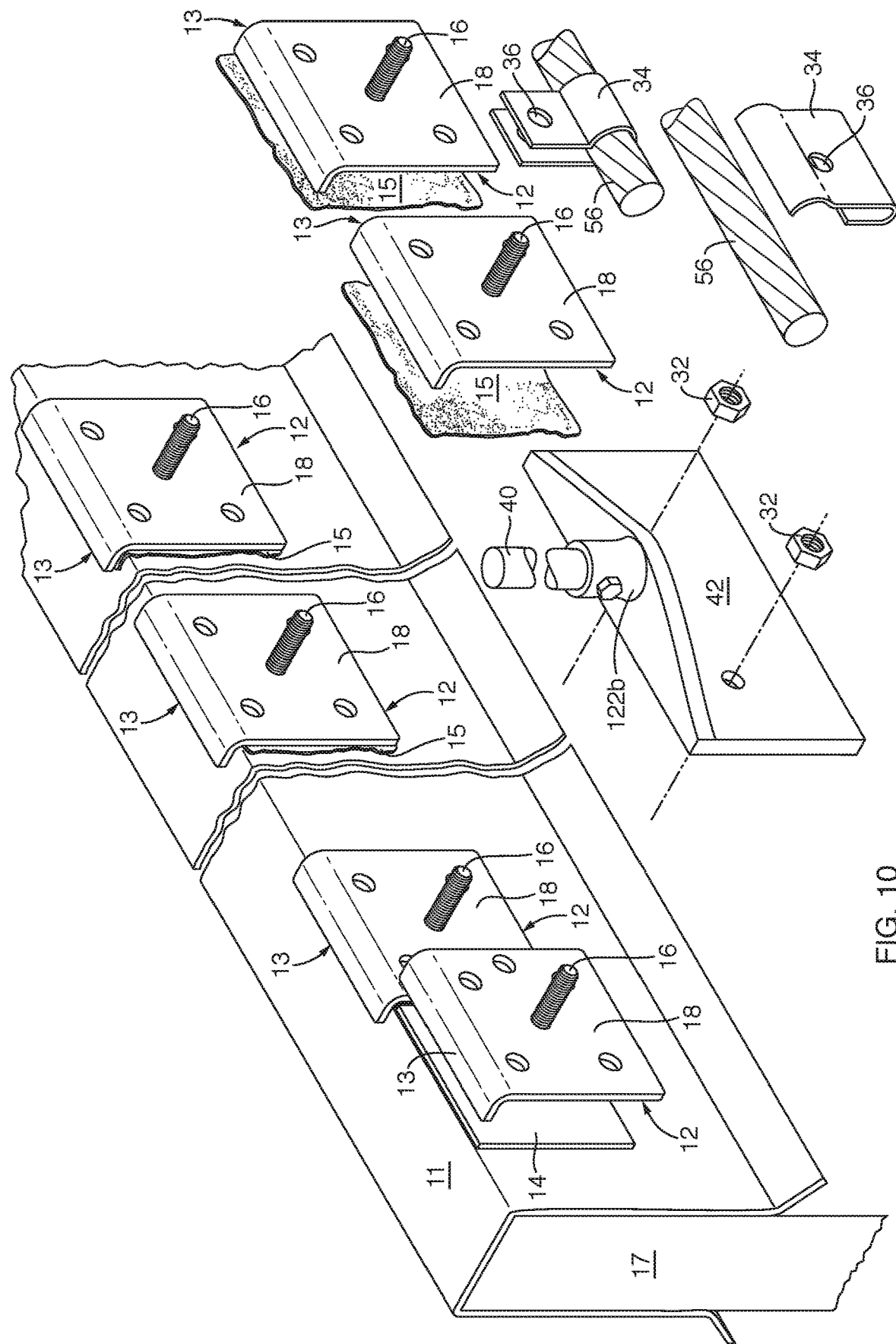
FIG. 10 is an upper, frontal, perspective view of a structure and protective layer illustrating installation of a base plate having a lip, in accordance with the invention, for mounting various hardware devices of a lightning protection system.
Figure 11:
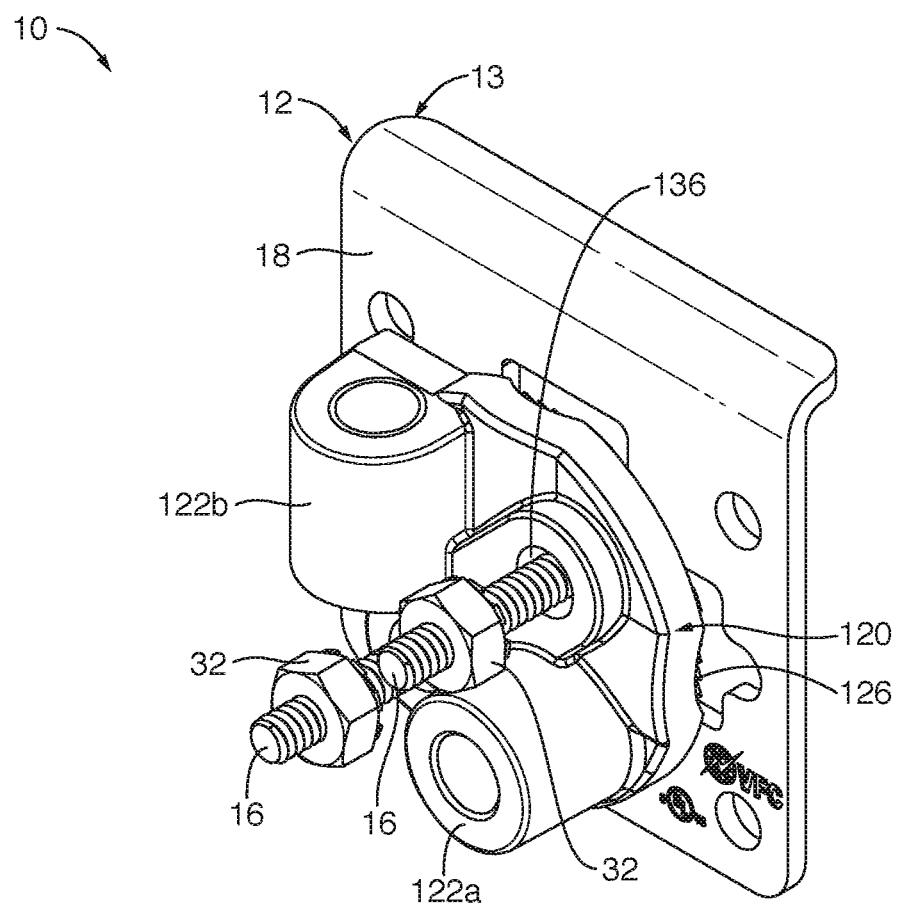
FIG. 11 is an upper, frontal, perspective view of a base plate having a lip, and provided with racks and teeth formed directly from the material of the base plate itself by cutting each rack on three sides and bending the rack out of plane to present the teeth away from the base plate, in accordance with the invention, this base plate mounting a head (point base) for receiving a point or air terminal and having relief channels for receiving a conductor cable, which cable is not shown in most of the views herein in order to illustrate clearly other details.
Figure 12:
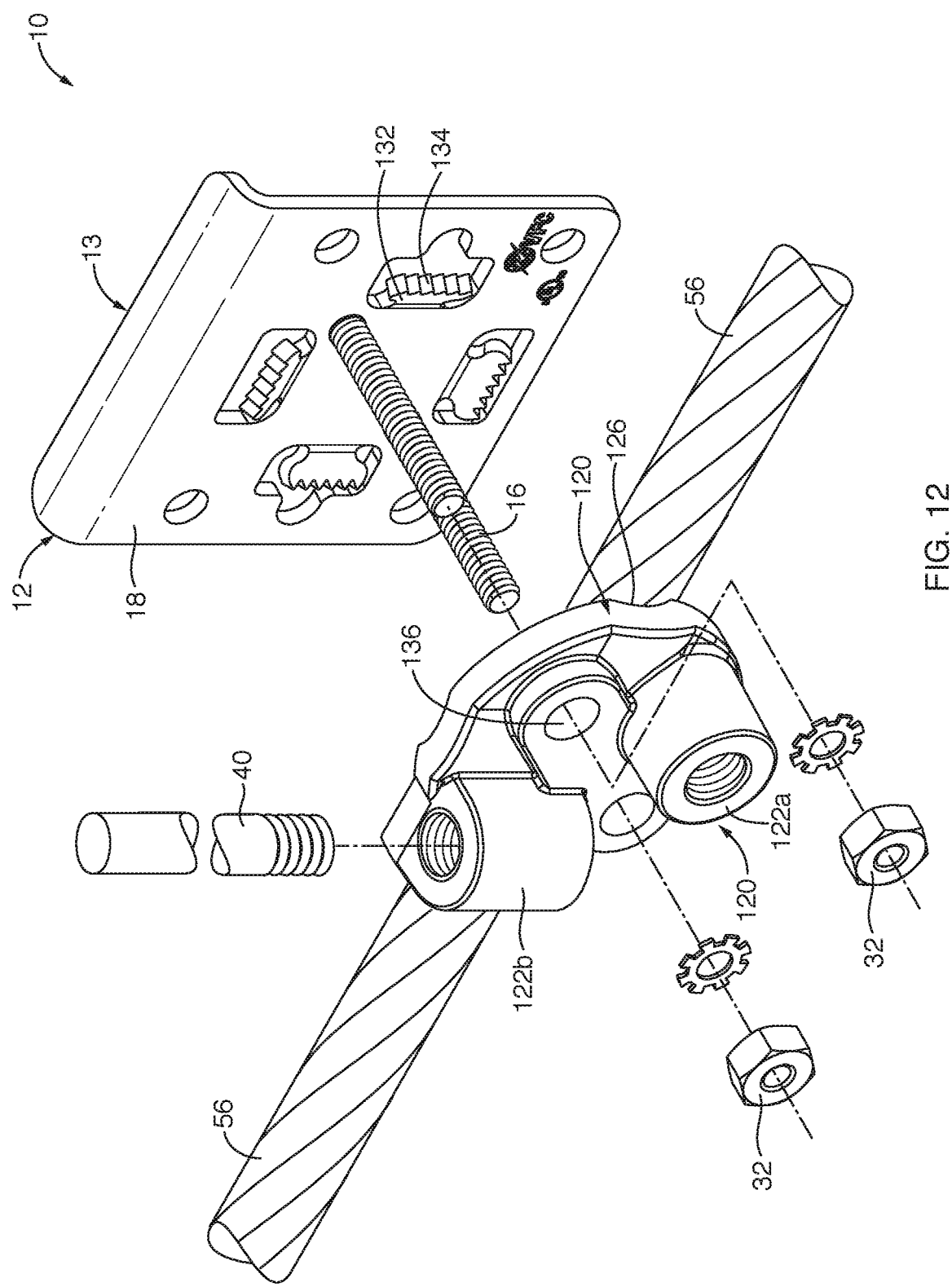
FIG. 12 is an exploded view thereof, with the conductor cable included in the location and orientation typical of installation methods.
Figure 13:
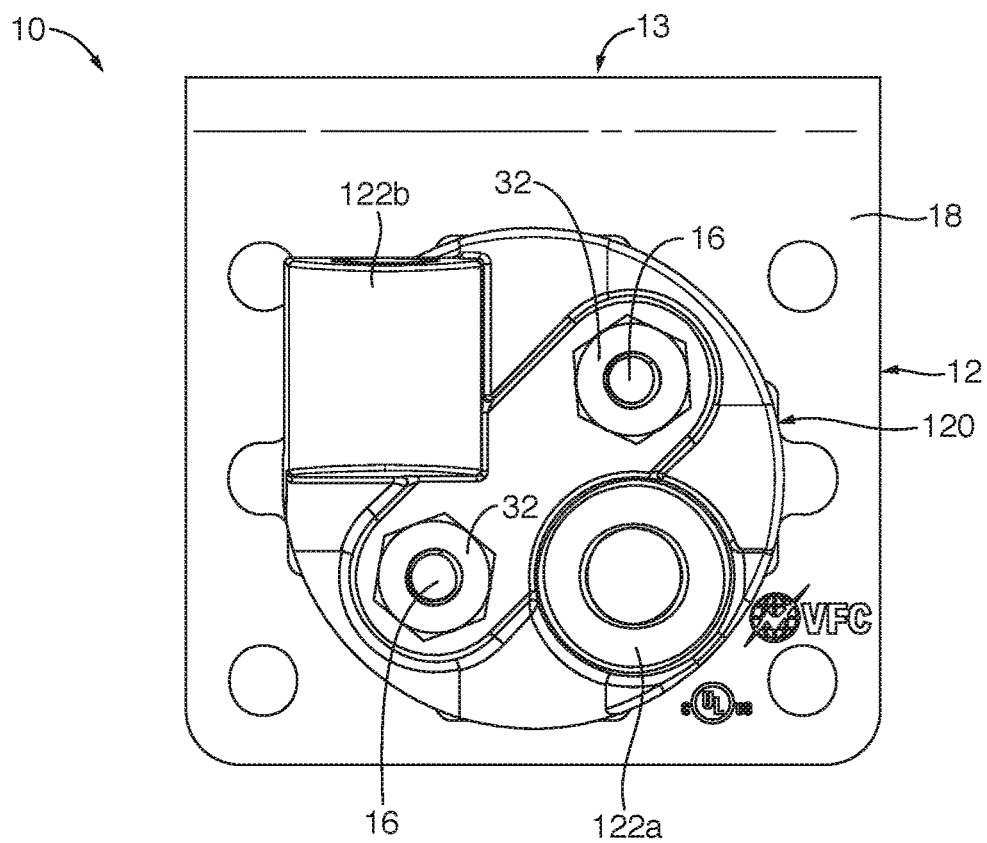
FIG. 13 is a front elevation view thereof, again absent the conductor cable for clarity of other details.
Figure 14:
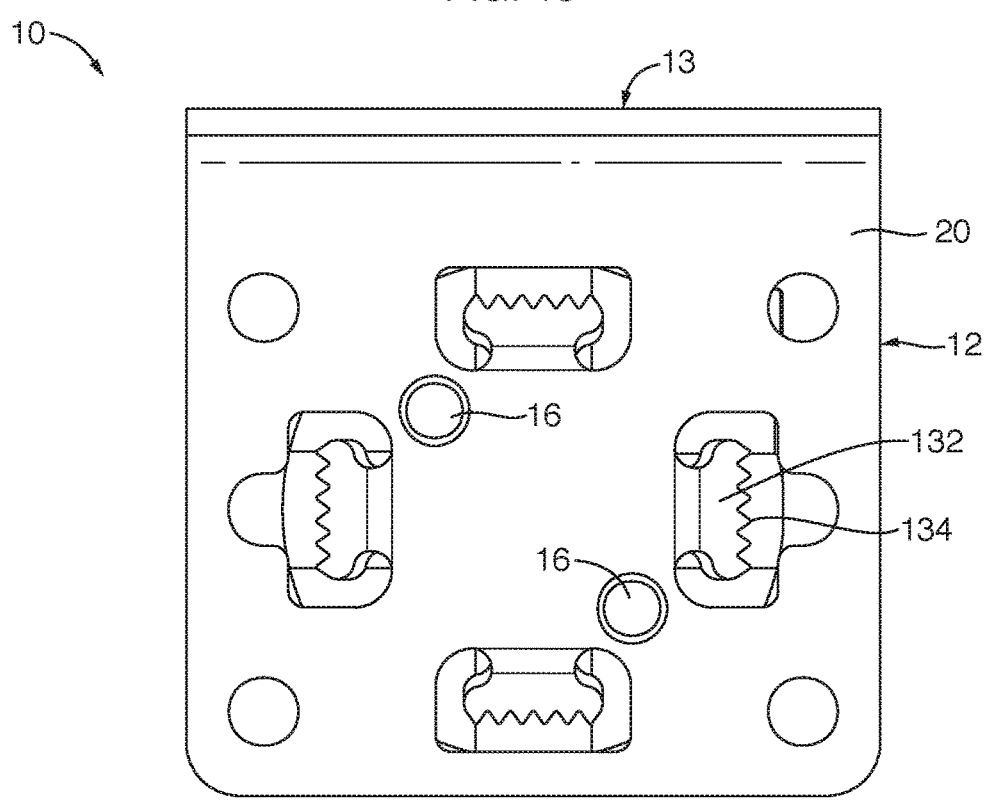
FIG. 14 is a rear elevation view thereof.
Figure 15:
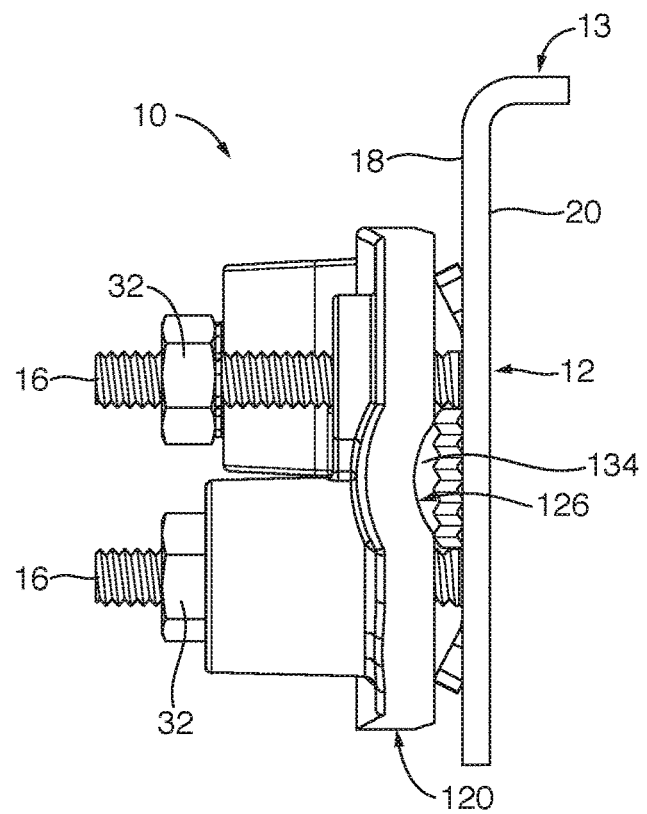
FIG. 15 is a right side elevation view thereof.
Figure 16:
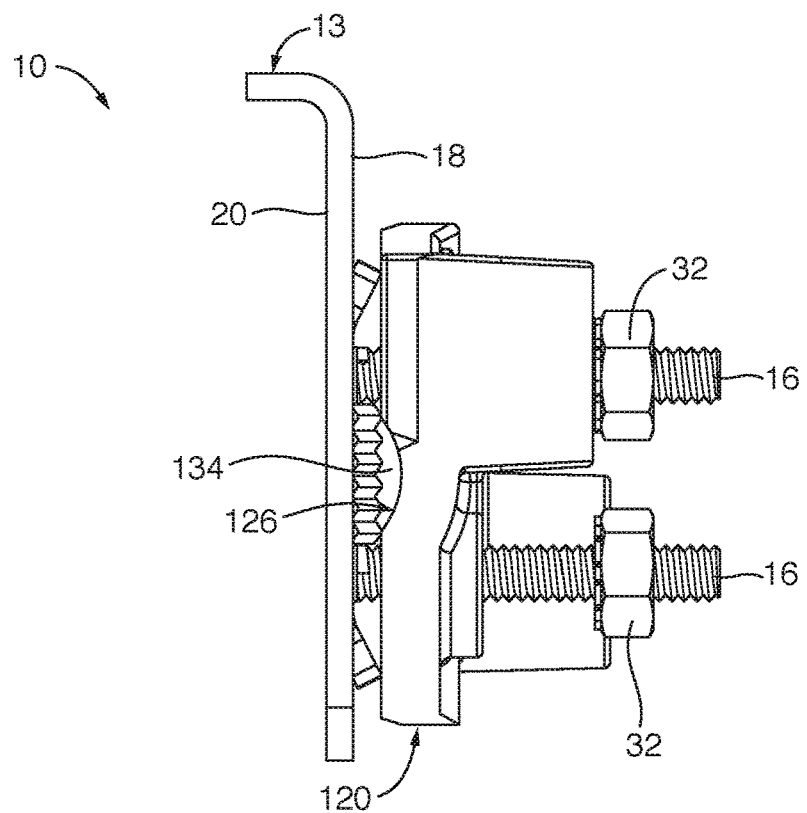
FIG. 16 is a left side elevation view thereof.
Figure 17:
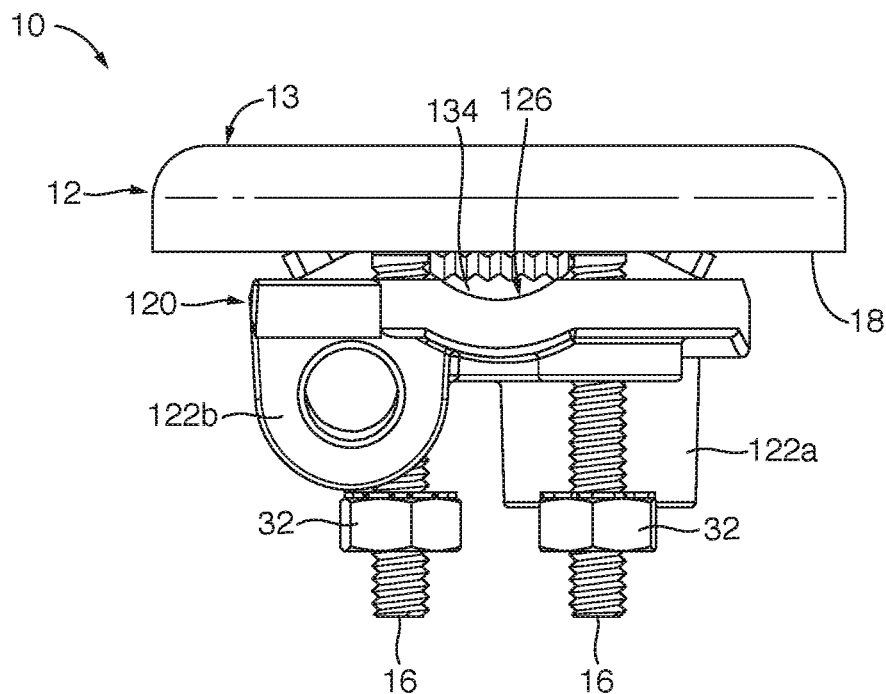
FIG. 17 is a top plan view thereof.
Figure 18:
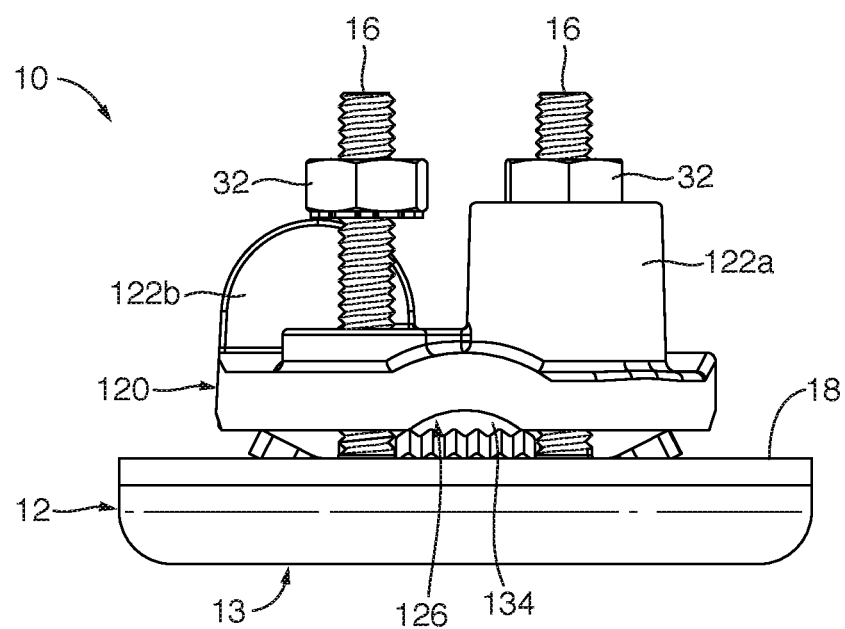
FIG. 18 is a bottom plan view thereof.

Referring to FIG. 10, while continuing to refer generally to FIGS. 1 through 21, a cable 56 may be supported by a cable bracket 34. Various embodiments are illustrated. However, in general, a base plate 12 may typically be fitted against a vertical surface 58, which vertical surface 58 terminates at an edge 60 or fold line 60 as the vertical surface 58 of the protective layer 11 turns (bends, joins) into a horizontal surface 62. The edge 60 is significant for several reasons.

For example, the base plate 12 will be secured to the vertical surface 58 by a pad 14 or some other smeared or otherwise applied adhesive 15, such as glue 15, mastik 15, reacting polymer 15, resin 15, or the like. Glues 15 may be reactive thermoset polymers 15, thermoplastic polymers 15, drying solvent based, mastic, and other adhesives that remain tacky, or other suitable materials. Thus, any one of several glues 15 or adhesive materials 15 may be placed, such as by smearing, spreading, scraping, rolling, or the like onto the back face 20 of the base plate 12 in order to adhere the base plate 12 to the vertical surface 58 of the protective layer 11.

Typically, the horizontal surface 62 need not receive any adhesive, nor need the lip 13 receive any adhesive 15. For example, a principal function of the lip 13 is to act as a square and a registration surface registering the lip 13, and thereby the base plate 12, against the fold line 60 by resting on the horizontal surface 62 right at that edge 60 or fold line 60 of the protective layer 11. Accordingly, the base plate 12 cannot drop below the fold line 60, being mechanically supported by the lip 13 resting on the horizontal surface 62.

Thus, by applying (e.g., smearing) an adhesive 15 on the back face 20 of the base plate 12, then registering and squaring the lip 13 on the horizontal surface 62 at the fold line 60, the adhesive 15 may then cure, set, cool, or otherwise complete its change to a permanent and suitably strong fastener 15 or attachment 15 holding the vertical surface 58 against the back face 20 of the base plate 20.

A technician may not only pressure the base plate 12 into the adhesive 15 against the vertical surface 58, but may urge the lip 13 downward (and pivoting, if necessary) against the horizontal surface 62 simultaneously with force applied against the vertical surface 58. In this way, the base plate 12 may descend and rotate to any degree necessary in order for the lip 13 to contact along its own length the horizontal surface 62 that is holding the lip 13 in place against further vertical descent.

The base plate 12 and lip 13 must provide the functions of self-alignment or orientation (e.g., pivot) and self-registration (vertical stop). That is, no separate tool nor technician skill is particularly required to register and align the lip 13 in contact with the horizontal surface 62. Meanwhile, no eyesight, judgment, or external tool (e.g., square) is necessary to rotate the base plate 12 to provide perfect alignment of the base plate 12 squared and aligned horizontally with the vertical surface 58. Rather, the fold line 60 or edge 60 and the horizontal surface 62 as they contact the lip 13 register vertically the base plate 12, and orient in rotation the base plate 12 to be perfectly aligned vertically and horizontally with the protective layer 11 along its vertical surface 58 and horizontal surface 62.

Thus, a technician may install a base plate 12, by urging the base plate 12 against an adhesive 15 and against the vertical surface 58, while urging the base plate 12 downward against the horizontal surface 62 at the fold line 60. Thereafter, the technician may simply leave the base plate 12 in place while the adhesive 15 increases in holding strength by curing, drying, cooling, or whatever mechanism is required. Thus, the base plate 12, which is typically formed of aluminum or other metal is not comparatively heavy compared to the cable 56 and other components that will eventually be secured thereto.

In general, one may use a base plate 12 in accordance with the instant invention as a mount 12 for various hardware including a point support 42 as a type of bracket 34, or a cable bracket 34, as illustrated, or of some different configuration. Base plates 12 may be secured to a vertical surface 62 of a protective layer 11 of a building 17, and left indefinitely to permit the adhesive 15 time to set, cure, react, or develop its adhesive strength appropriately. Once firmly attached it may hold a cable 56, point 40, or the like, secured by its bracket 34 to the corresponding stud 16.

Pads 14 may be used as described in the references incorporated hereinabove by reference, but are not necessary. Specifically, the lip 13 provides vertical alignment by stopping the base plate from moving below the edge 60 at which the vertical surface 58 and horizontal surface 62 fold or join.

Likewise, the base plate 12 is "squared up" against rotation of the base plate 12 about an axis (e.g., centerline) of the stud 16. It 12 is fixed thereby at the proper orientation by the lip 13 acting as a square to "square up" the base plate 12 with the horizontal surface 62 and the fold line 60 or edge 60. Meanwhile, the lip 13 acts as a vertical support 13 against the weight of the base plate 12 and stud 16 form sliding, slipping, and drifting, or otherwise descending or reorienting along the vertical surface 58. The base plate 12 and lip 13 act similarly if the plate portion 12 is placed on a horizontal surface 58, where vertical forces do not present the same problems.

Referring to FIGS. 11 through 18, while continuing to refer generally to FIGS. 1 through 21, a base plate 12 may include two studs 16 in order to support a head 120 of the universal type discussed in the references incorporated hereinabove by reference. For example, a head 120 may include two receivers 122a, 122b. The particular receiver 122a, 122b used to receive a point 40 will depend upon whether the base plate 12 is mounted to a horizontal surface 62 or a vertical surface 58.

In the illustrated embodiment, the head 120 is provided with relief channels 126, which operate as channels 126 for contacting a cable 56 passing between the head 120 and the base plate 12, as described in detail in the references incorporated hereinabove by reference. The front face 128a of the head 120 receives a nut 32 as a keeper 32 on each of the studs 16 protruding from the base plate 12. Thus, as each nut 32 is threaded onto the threads 30 of the stud 16, corresponding thereto, the head 120 may be tilted about the cable 56 according to how far "down" each respective nut 32 is secured along its corresponding stud 16.

Thus, as discussed in further detail in the references incorporated hereinabove by reference, the relief channel 126 and the head 120 in cooperation with the nuts 32 on the studs 16 provide additional final adjustment to orient a head 120 against a base plate 12. Meanwhile, the cable 56 is captured to make contact with the head 120 along the relief channel 126 appropriate to the orientation thereof.

On the back face 128b of the head 120, the relief channels 126 may be forged, machined, or otherwise fabricated. Opposite the relief channel 126 receiving the cable 56, a rack 132 is provided. The rack 132 may be cut directly from the base plate 12, on three edges of the rack 132. That is, a rack 132 may be formed by cutting it free on three edges while leaving it connected to the base plate 12 only on a single remaining edge.

Opposite the connected edge of the rack 132 are teeth 134 presented by bending the rack 132 away from the base plate 12. In the illustrated embodiments, the teeth 134 are moved out of alignment with the base plate 12 and toward the cable 56 by bending the rack 132 along its attached edge at the main portion of the base plate 12. Thus, the teeth 134 tend to provide a somewhat resilient force urging the cable 56 against the relief channel 126 in the head 120. This provides contact pressure and contact area between the head 120 and conductor 56 sufficient to maintain good electrical contact and current-carrying capacity between the cable 56 and the head 120.

Apertures 136 in the head 120 receive the corresponding studs 16. Again, the references incorporated hereinabove by reference describe in detail the multiple orientations and fastening means by which the head 120 may be oriented and secured to either a vertical surface 58 or a horizontal surface 62. In either installed orientation, the head 120 may receive a point 40 in an appropriate receiver 122a, 122b that will orient the point 40 vertically extending upward and away from the head 120.

One will note that a base plate 12 in the embodiments of FIGS. 11 through 18 may be installed exactly as described hereinabove with respect to FIGS. 1 through 10. For example, a pad rather conventional adhesive 15, or a specialized adhesive 15, may be applied on site to secure the base plate 12 against a vertical surface 58 or a horizontal surface 62. Any extruded excess may be removed promptly by using a cloth, hand, putty knife or the like around the edges of the base plate 12. After suitable time in order for the adhesive 15 to set, the cable 56 may be run along the path between the various base plates 12, being secured periodically (e.g., at about three feet or one meter on centers) between the brackets 34 dedicated to supporting the cable 56. About every twenty feet (six meters) a head 120 (point base 120) and corresponding point 40 will be installed therealong, gripping the conductor cable 56 between the base plate 12 and the head 120 as the conductor 56 passes through.

At that installation step, the cables 56 may be pulled taut and the respective keepers 32 on the studs 16 be secured tightly to the cables 56 by their brackets 34, the heads 120 on their corresponding base plates 12, fixing the positions and orientations of each. At the time of final installation of the cable 56, secured by various brackets 34 and heads 120, substantial force may be applied to the various base plates 12 through the studs 16 against which the various keepers 32 have secured the various brackets 34 and heads 120. That installation time may be minutes, hours, or days after the adhesives 15 are originally applied between the back face 20 of each base plate 12 and the appropriate surface 58, 62 of the protective layer 11 of the building 17.

Thus, the labor of mounting, registering, orienting, and squaring the base plates 12 need not require waiting for the adhesives 15 to set up or cure before being left without further human intervention, applied force, or the like needing to persist. Later, even much later counted in minutes, hours, or days, after whatever time required for setting of the adhesive 15, the much larger forces (pounds of weight, and tens of pounds of tension), orders of magnitude larger than the gravitational force (typically measured in ounces) on a base plate 12, can be applied without dislodging any base plate 12.

Referring to FIGS. 1-8, and generally to FIGS. 1 through 21, an anchor 10 may be formed to have a base plate 12. The base plate 12 will typically be secured to a structure, such as a building, to support lightning protection components, such as points 40 and cabling 56. The cabling 56, about half an inch in diameter (1.25 cm) and secured about every three feet of length, interconnects the points 40 or rods 40, distributed about every twenty feet (six meters). Each of the points extends vertically upward to cause a high voltage stress field around the distal end or extreme tip thereof, thereby attracting lightning, in preference to the protected structure 17.

Points 40 are typically formed of rod of a suitable diameter (on the order or half and inch (2.5 cm) or larger, and having a length of from about 8 to about 24 inches (21 to 60 cm), typically about 10 inches (25 cm). Length requirements are best minimized by installing all points uniformly vertical and uniformly positioned at a vertical height. Accordingly, each of these points tends to cause a stress concentration field of voltage potential about the distal end thereof. This preferentially causes each of these tips of these points or rods to be the first items struck by lightning, rather than having other structural or electrical components of the building take such a risk.

Anchors 10 in accordance with the invention may be distributed on the outermost weather protection 11, such as an outer layer 11 of metal or polymer material. The protective layer 11 may be wrapped over and around walls, parapets, cupolas, or other extremities of a building 17. Typically, a ridge line, a parapet around a roof region, or the like may receive the anchors 10. The anchors 10 will support various fasteners (a term of art in lightning protection technology), which may be thought of as mechanical brackets, or other securement mechanisms to hold cables, the points, and so forth.

The base plate 12 may be fabricated with a stud 16 extending from the front face 18, while the fastening material 14, 15 (in the form of a pad 14 or an amorphously applied glue 15, resin 15 or other adhesive 15) is secured to a back face 20 thereof. A swaging, forging, or cold working manufacturing process may be similar to that of manufacturing a bolt, a nail, or the like. In an alternative embodiment, the studs 16 may be attached to the base 12 after individual fabrication of each 12, 16. The base plate 12 may be formed from sheet stock, bent near one edge to form the lip 13. Thus, one may speak of the base plate 12 and lip 13 as separate entities, or of the base plate 12 containing a lip 13 or lip portion.

The base plate 12 may be provided with a fitted elastomeric pad 14 or with an adhesive 15 applied from a bulk supply by smearing or other application process. Either attachment mechanism 14, 15 operates as a mechanical fastener and seal. By a choice of polymers (preferably elastomeric), it 14, 15 also acts as an adhesive mechanism, thermal expansion attenuator or match, strain attenuator, and so forth. That is, between the base plate 12 and a corresponding portion of a building 17 or its shroud 11 as ultimate weather protection layer 11, a differential in coefficients of thermal expansion may exist. Similarly, temperature variations may change properties.

Likewise, freezing and thawing may intervene in capillary spaces between the base plate 12 and a building 17. A freeze-thaw cycle may tend to separate the base plate 12 of the anchor 10 from the building 17. Accordingly, the fastening pad 14 or adhesive 15 may be tacky and flexible rather than rigid.

Referring to FIGS. 1 through 8, as well as FIGS. 1 through 21. generally, the stud 16 protrudes at a right angle or perpendicularly with respect to the front face 18 or surface 18 of the base plate 12. Meanwhile, the back face 20 or surface 20 of the plate 12 receives the fastening material 14, 15 mechanically adhered thereto to support the stress, strain, tension, compression, and shear that may be applied by loads introduced through the studs 16 to the base plate 12.

Studs 16 may include a tip 26 formed as a screw or bolt. Typically, the tip 26 will be slightly tapered, in order to pilot the studs 16 into a threaded keeper 32, such as a nut 32. At the opposite end of the studs 16 is the root 28 and or root portion 28. The root portion 28 may or may not be threaded. That is, threads 30 near the tip 26 may receive a keeper 32, nut 32, or the like, but threads 30 need only extend sufficiently to permit the keeper 32 to move toward the base plate 12 sufficiently to hold an object such as a cable bracket, 34, point support 42 holding a point 40, and so forth. Threads 30 need not proceed all the way to the root 28 of the studs 16.

Proper and improper registration against a datum, such as an edge of a cover layer 11, alignment in parallel or at right angles, and orientation at a particular angle with respect to a building 17 may all be obvious to the eye of a casual observer. Thus, the lip provides a registration surface to contact the surface of the building 17 or layer 11. By being bent precisely it also provides by virtue of the fold line formed between it and the base plate 12 a square assuring that the fold line is parallel to the edge of the protective layer 11 at which the anchor is secured.

Moreover, whenever the base plate is mounted to a vertical surface of the layer 11 or building 17, the lip 13 acts as a support 13 against gravity tending to slide the base plate downward before an adhesive 15 has fully set, cured, dried, reacted, vulcanized, or otherwise stabilized mechanically.

The base plate 12, so positioned, registered, squared, and oriented by the lip 13 assures a rapid yet precise installation registered and squared to the building 17 on its protective layer 11. This is not so much for mechanical strength, which may vary little with a slight misalignment. Rather, it is valuable for speed of installation, reducing labor time by reducing the time and complexity of holding the base plate 12 in place during any wait time for setting, curing, drying, or the like, and for ultimate aesthetics, provided by instant alignment and orientation of the base plate 12 of the anchor 10. This is not trivial, because a slight variation from a uniform height, uniform registration, or uniform orientation may be immediately noticeable to a casual observer.

Referring to FIGS. 9 and 10, exploded views are shown for various embodiments of anchors 10 in accordance with the invention. Studs 16 are secured, fabricated, attached, or integrally manufactured to fix with and extend from the base plate 12. A keeper 32, such as a nut 32 threads onto the threads 30 of the stud 16, securing a bracket 34 or fastener 34 to the base plate 12, and thus to the mounting surface of the protective layer 11 of a building 17.

Studs 16 pass through apertures 36, making themselves available for receiving the keeper 32 or the nut 32. As each nut 32 is threaded toward the root 28, beginning at the tip 26 of the stud 16, the fastener 34 is drawn toward the front face 18 of the base plate 12. In the illustrated embodiments, a bracket 34 secures the cable 56, while a point support 42 supports a point 40. The point 40 and protective layer 17 are shown in engineering "cut" style compressing (cutting out) the intermediate length continuing between the portions illustrated.

A location may be selected, for a base plate 12 on the protective layer 17, and, after suitable cleaning may receive a base plate, registered and squared by the lip 13, and secured by a pad 14 or bonding material 15, such as glue 15, epoxy 15, adhesive 15, resin 15 (whether polymerizing, curable, heated, otherwise reactive, dehydrating, solvent-evaporating, or the like in nature).

The stud 16 on the base plate 12 receives a bracket 34 to hold the cable 56 or receives a head 120 to support a point 40. Apertures 36, 136 receive studs 16 therethrough. A nut 32 or other keeper 32 secures the bracket 34 or head 120 to the stud.

A system 10 in accordance with the invention may include a head 120 manufactured by any suitable method, such as casting, forging, rolling, stamping, machining, or the like. Thus, the head 120 may be a forging, casting, fabrication, or the like.

In certain embodiments, it is possible that the head 120 may be stamped, but such a configuration is less desirable. One reason that a casting or forging process may be preferred is that current density should be low enough to not melt with a lightning strike and thermal mass high enough not to melt with a lightning strike. Plenty of solid, conducting metal cross section is desired. A suitable dimension for the diameter of the head 120 is from about 2 to about 3 inches (5-8 cm). Typically, 2¼ inches (6 cm) would provide a good target diameter for the head 120. Similarly, the thickness may be from about ½ to about 1 inch. A target thickness of about 0.63 inches is contemplated for one present design contemplated.

The head 120 may be provided with various apertures 122a, 122b, 136, as well as excavations 126 as relief 126 or relief channels 126 forming slots 126 on the underside 128b opposite the top face 128a. The aperture 122a operates as a receiver 122a to receive a vertically oriented point 40 therein by threaded engagement, with the head 120 in a horizontal orientation. In contrast, the receiver 122b extends through the circumference of the head 120 in order to orient a point 40 vertically when the head 120 is mounted to a base plate 12 against a vertical surface of a building or other protected structure.

Herein, a trailing letter following a reference numeral refers to a specific instance of the item identified by the reference numeral. Therefore, it is appropriate to refer to a receiver 122 to include any particular one or all receivers 122, and the receivers 122a, 122b as those receivers that are specified or specific examples of structure or function.

A point 40 may be threaded into the appropriate receiver 122a, 122b. This should follow after the head 120 has been properly mounted to a surface of a protective layer 11 or otherwise outermost layer 11 of a protected structure 17. The references incorporated hereinabove by reference provide further details of structures, components and methods contemplated for fabrication and installation.

Racks 132 may be cut directly on three edges from the base plate 12, then bent to extend away from it and toward the head 120. Thus a cable 56 is captured between the teeth 134 formed in the rack 132 and the relief channel 126 or slot 126. Details of manufacturing are contained in the documents incorporated hereinabove by reference, which documents detail numerous installation procedures contemplated. The racks may be cut on three edges and bent away from the plate 12, or may be part of a separate cleat plate mounted between the base plate 12 and the head 120. Only the racks 132 with their teeth 134 along with the studs 140 extend above the planar surface of the front face 18 of the base plate 12.

Orientation of the base 120 may facilitate a point 40 oriented vertically, regardless of whether the base plate is oriented vertically or horizontally on the protective layer (e.g., whether the base 12 is placed on a horizontal or vertical surface). Proper orientation of a point 40 may be accommodated by a combination of rotating or otherwise orientating the head 120, and selecting whichever of the receivers 122a, 122b will orient a point 40 vertically. Rocking the head 120 about the cable 56 adds a degree of freedom (pivoting) to permit adjusting the pivoting head 120 across the cable 56 to trim the orientation of the point 40.

Figure 19:
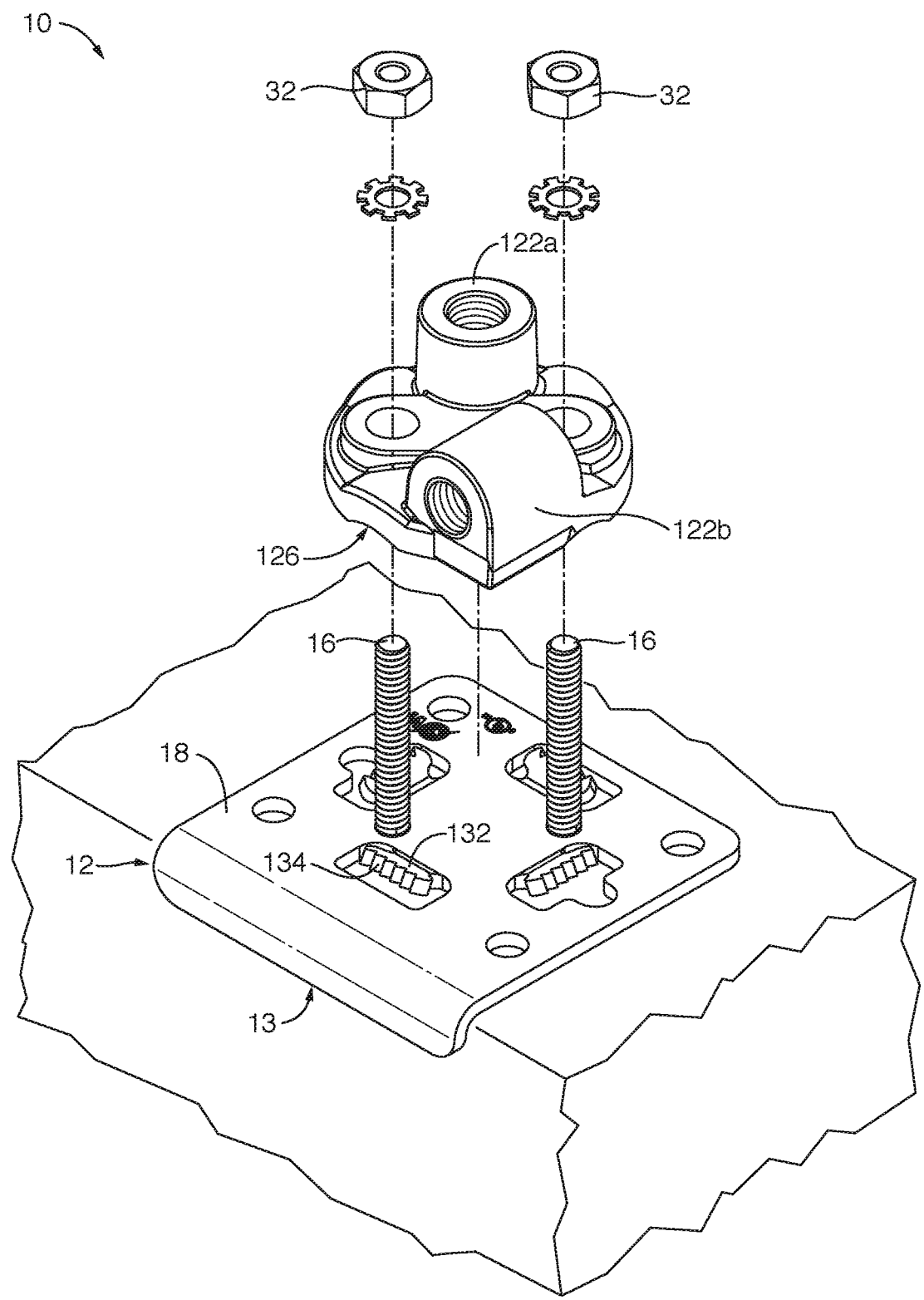
FIG. 19 is an upper, perspective, exploded view of a base plate with a lip, and a head for a point mounting on a horizontal building surface where the lip provides registration and squaring, but is not required to provide vertical support, this installation intended to receive a conductor cable in the relief channel extending parallel to the edge or fold line of the protective outer layer of a building structure.
Figure 20:
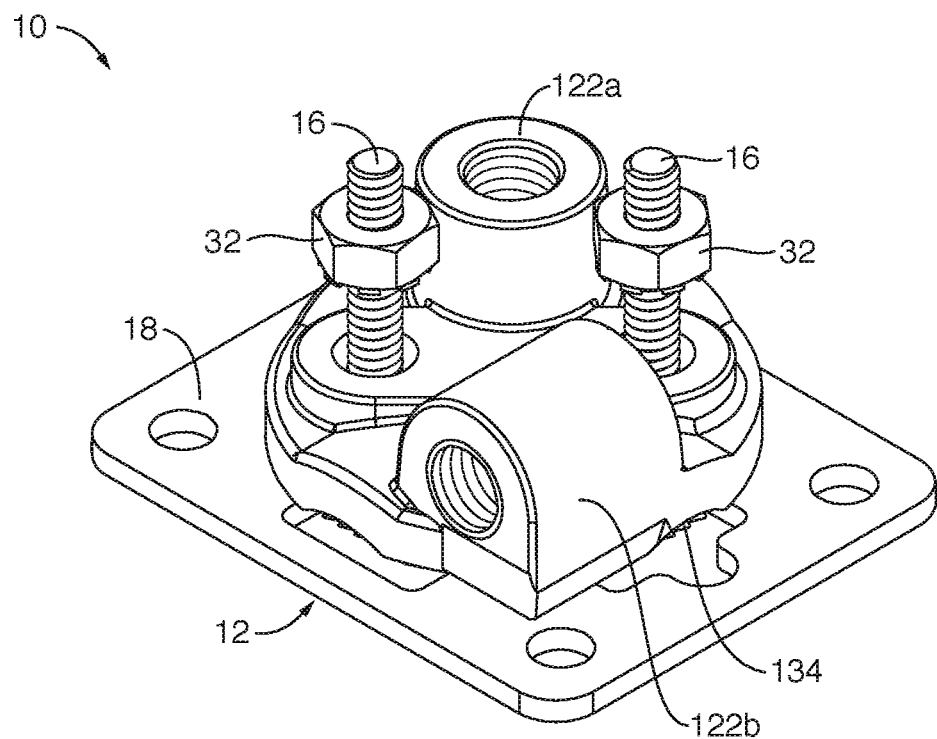
FIG. 20 is an upper, perspective view of an alternative embodiment of a base plate, uninstalled and therefore lacking the conductor cable that runs through it, this device having no lip but having the racks and teeth formed directly in and of the material of the base plate to receive and clamp a conductor cable in either of the mutually orthogonal relief channels, and typically mounted on a horizontal building surface, here supporting a forged head or point base.
Figure 21:
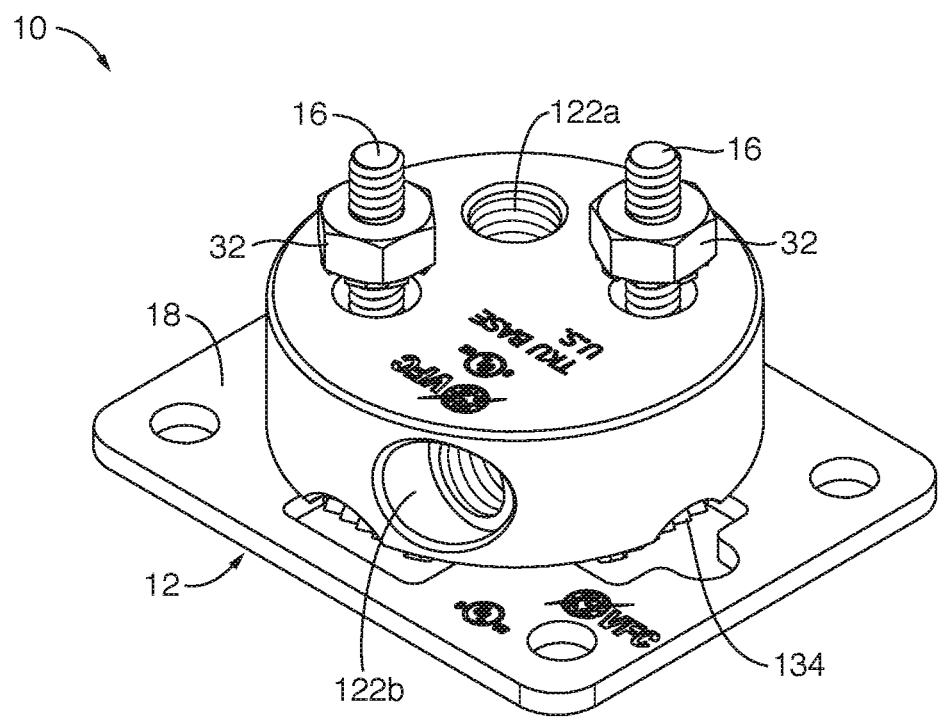
FIG. 21 is an upper, perspective view of an alternative embodiment of a base plate, uninstalled and therefore lacking the conductor cable that will run through one of the relief channels (either, depending on cable 56 path and base plate 12 orientation) upon installation, this device having no lip but having the racks and teeth formed directly in and of the material of the base plate, and typically mounted on a horizontal building surface, supporting a classic puck-style head or point base.

Referring to FIGS. 19-21, the base plate 12, and thus the head 120, may be mounted to a horizontal surface 58. The lip 13 of FIG. 19 is registered and squared against the vertical surface 62 of a structure 17 at its outermost layer 11. The installation orientation shown in the embodiments of FIGS. 20 and 21 do not even require a lip 13 for support during setting of an adhesive.

In any of those three types of installations, the lip 13 need not support the weight of a base plate 12, let alone the head 120. While waiting for setting of the adhesive 15, the horizontal surface 58 is capable of, and positioned for, supporting the weight of the entire anchor 10. For convenience that weight may even include any bracket 34 or head 120 to eventually anchor the conductor 56. On the other hand, the lip 13, if and when available as in FIG. 19, is still very useful for rapid registration and squaring of the base plate along an edge 60 where the horizontal surface 58 and vertical surface 62 meet.

In all the foregoing embodiments, one will notice that the mandible or cleat plate routinely included in previous embodiments illustrated in the references incorporated by reference, is absent. Instead, the teeth 134 and their supporting racks 132 are formed directly by cutting on three edges thereof from the basic, planar stock of which the base plate 12 is formed.

The fourth edge of each rack 132 is a bend at which the rack 132 is not separated but intact with the planar stock of the base plate. The rack 132 is simply angled away from the base plate 12 at the bend. This provides elevation of the conductor 56 away from the base plate, and a pre-determined amount of resilient force by the teeth 134 and rack 132 urging the conductor 56 toward the relief channel 126 in the head.

This embodiment of integrated racks 132 and teeth 134 eliminates fabrication, inventory, alignment, sliding on, and securement of the previous cleat plate component. Thus, steps are reduced in manufacturing, storage, distribution, instruction, and installation, saving time and consequently labor. Eliminated steps result as well in reducing errors from missing components or missed steps during installation.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus adapted to mount lightning protection equipment to a structure to be protected, the apparatus comprising:
    a base plate, having a first edge, extending longitudinally in a straight line, and a contact surface extending away from the first edge in a direction corresponding to at least a first right angle orthogonal to the longitudinal direction of the edge;
    a lip extending rigidly from the base plate at a second right angle, orthogonal to the first right angle and to the longitudinal direction of the first edge;
    a head, formed of a solid material in a single, integral piece having an inner face and an outer face, the inner face positionable proximate the base to be securable mechanically thereto and the outer face formed to receive therein a point capable of attracting the lightning strike;
    the head, provided with a relief channel formed in the inner face and sized to partially surround a conductor, holding the conductor in contact against the base, the head being tiltable about the circumference of the conductor; and
    a fastener, secured to extend from an outer surface opposite the contact surface, capable of securing a component of a lightning protection system to the base plate.
2. The apparatus of claim 1, comprising an adhesive capable of application to the contact surface and securing the contact surface to the structure.
3. The apparatus of claim 2, wherein the structure forms a second edge as a junction between a horizontal surface and a vertical surface of the structure.
4. The apparatus of claim 3, wherein:
    the structure comprises a protective layer continuous through and perpendicular to the second edge, thereby presenting a horizontal surface, and vertical surface extending from the second edge.
5. The apparatus of claim 4, comprising a bracket selectively securable to the base plate by the fastener.
6. The apparatus of claim 5, wherein the adhesive has mechanical properties insufficient to support the weight of the apparatus at a time of installation of the base plate and adhesive on the structure.
7. The apparatus of claim 6, wherein:
    the base plate is fitted against the adhesive on the vertical surface; and
    the lip registers the base plate vertically and orients the base plate in rotation about a horizontal axis thereof by squaring the base plate with respect to the second edge.
8. The apparatus of claim 7, wherein:
    the base plate has mass and weight supported by the lip resting on the horizontal surface upon installation; and
    the adhesive has mechanical properties that increase, with time after installation, a strength thereof in holding the base plate against the vertical surface.
9. The apparatus of claim 8, wherein the component is selected from a bracket capable of securing a cable acting as a lightning conductor, and a head capable of securing and vertically orienting a terminal "point".
10. The apparatus of claim 9, comprising an array of base plates installed on the structure, interconnected by the cable.
11. An apparatus adapted to mount lightning protection equipment, the apparatus comprising:
    a base plate, having a first edge, extending longitudinally in a straight line, and a contact surface extending away from the first edge in a direction corresponding to at least a first right angle orthogonal to the longitudinal direction of the edge;
    a lip extending rigidly from the base plate at a second right angle, orthogonal to the first right angle and to the longitudinal direction of the first edge;
    a head, formed of a solid material in a single, integral piece having an inner face and an outer face, the inner face positionable proximate the base plate to be securable mechanically thereto and the outer face formed to receive therein a point capable of attracting the lightning strike;
    the head, provided with a relief channel formed in the inner face and sized to partially surround a conductor, holding the conductor in contact against the base plate, the head being tiltable about the circumference of the conductor;
    a fastener, secured to extend from an outer surface opposite the contact surface, capable of securing a component of a lightning protection system to the base plate; and
    a structure that forms a second edge as a junction between a horizontal surface and a vertical surface of the structure.
12. The apparatus of claim 11, wherein the lip registers the base plate vertically and orients the base plate in rotation about a horizontal axis thereof by squaring the base plate with respect to the second edge.
13. The apparatus of claim 12, wherein the component is selected from a bracket capable of securing a cable acting as a lightning conductor, and a head capable of securing and vertically orienting a terminal "point".

14. The apparatus of claim 13, further comprising an array of base plates installed on the structure, interconnected by the cable.

15. The apparatus of claim 12, further comprising an adhesive capable of application to the contact surface and securing the contact surface to the structure.

\* \* \* \* \*